United States Patent
Yoo et al.

(10) Patent No.: US 12,003,793 B2
(45) Date of Patent: Jun. 4, 2024

(54) TRANSMISSION APPARATUS AND RECEPTION APPARATUS FOR PARALLEL DATA STREAMS

(71) Applicant: LG ELECTRONICS INC., Seoul (KR)

(72) Inventors: Jonghun Yoo, Seoul (KR); Yoonjung Kim, Seoul (KR); Sangheon Lee, Seoul (KR); Jaehyeok Lee, Seoul (KR); Taeil Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 17/599,404

(22) PCT Filed: May 8, 2019

(86) PCT No.: PCT/KR2019/005456
§ 371 (c)(1),
(2) Date: Sep. 28, 2021

(87) PCT Pub. No.: WO2020/226203
PCT Pub. Date: Nov. 12, 2020

(65) Prior Publication Data
US 2022/0182686 A1 Jun. 9, 2022

(51) Int. Cl.
*H04N 21/2343* (2011.01)
*H04N 21/236* (2011.01)
(Continued)

(52) U.S. Cl.
CPC ....... *H04N 21/2343* (2013.01); *H04N 21/236* (2013.01); *H04N 21/2381* (2013.01); *H04N 21/6106* (2013.01)

(58) Field of Classification Search
CPC ......... H04L 65/70; H04L 65/60; H04L 69/22; H04N 21/4402; H04N 21/43637;
(Continued)

(56) References Cited

U.S. PATENT DOCUMENTS

| | | | | | |
|---|---|---|---|---|---|
| 2002/0142767 | A1* | 10/2002 | Mears | ................... | H04W 16/14 455/11.1 |
| 2011/0274180 | A1* | 11/2011 | Lee | ...................... | H04N 19/164 375/E7.092 |

(Continued)

FOREIGN PATENT DOCUMENTS

| | | | | |
|---|---|---|---|---|
| GB | 2555818 A | * | 5/2018 | ............. H04L 67/02 |
| JP | 2005-341567 A | | 12/2005 | |

(Continued)

OTHER PUBLICATIONS

Parallel Encoding/Decoding Method And Apparatus KR 20150033194 A (Document: D1); Date Published: Apr. 1, 2015.*

*Primary Examiner* — Phung-Hoang J Nguyen
(74) *Attorney, Agent, or Firm* — Birch, Stewart, Kolasch & Birch, LLP

(57) ABSTRACT

The present invention relates to a transmission apparatus and reception apparatus for parallel data streams. The present specification discloses a wireless stream transmission apparatus comprising: an encoder for dividing an inputted picture into multiple areas and performing, for each area, encoding so as to generate a bitstream including a header and data; a DS generating unit for removing or modifying at least a portion of headers related to the multiple areas into compact headers, and combining, with the data, at least the remaining headers which have not been removed or the compact headers so as to generate a data stream for each area; and a communication unit for packing the data stream so as to generate a packet, and transmitting, on the basis of wireless communication, the packet to a wireless stream reception
(Continued)

apparatus. By using modified headers in applications where real time is important, it is possible to reduce a traffic burden and satisfy low-latency requirements.

10 Claims, 23 Drawing Sheets

(51) Int. Cl.
*H04N 21/2381* (2011.01)
*H04N 21/61* (2011.01)

(58) Field of Classification Search
CPC ............. H04N 21/4122; H04N 21/236; H04N 21/2343; H04N 21/6106; H04N 21/2381
USPC ........................................... 348/14.01–14.16
See application file for complete search history.

(56) References Cited

U.S. PATENT DOCUMENTS

| | | | |
|---|---|---|---|
| 2012/0210012 A1* | 8/2012 | Jansson | H04L 67/562 |
| | | | 709/230 |
| 2015/0016519 A1 | 1/2015 | Xu et al. | |
| 2017/0273046 A1* | 9/2017 | Piscopo, Jr. | H04L 65/1073 |

FOREIGN PATENT DOCUMENTS

| | | |
|---|---|---|
| KR | 10-2007-0074503 A | 7/2007 |
| KR | 10-2011-0124161 A | 11/2011 |
| KR | 10-2015-0033194 A | 4/2015 |

\* cited by examiner

FIG. 3
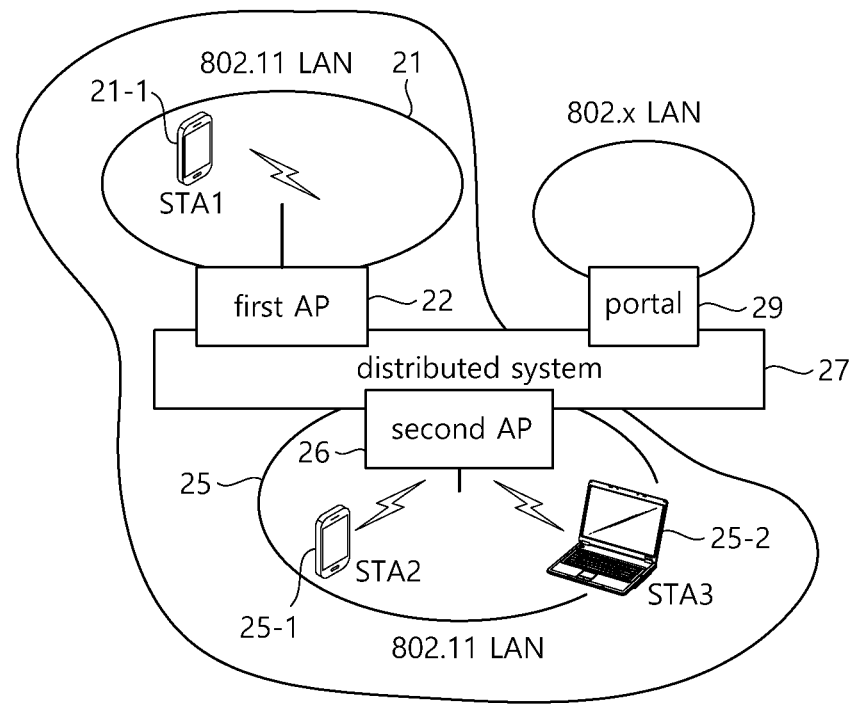
(A)
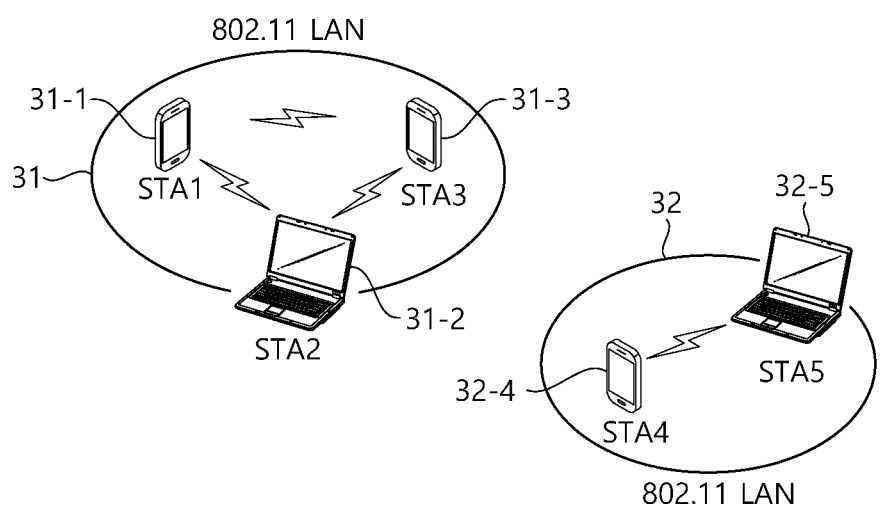
(B)

FIG. 18

| | header_type | size_of_header | picture_width | picture_height | |
|---|---|---|---|---|---|
| header#0 | 0xff12 | 0x100 | 0x870 | 0x870 | ... | transmission error

| | header_type | size_of_header | picture_width | picture_height | |
|---|---|---|---|---|---|
| header#1 | e 0xff11 | 0x100 | 0x870 | 0x870 | ... | transmission error

| | header_type | size_of_header | picture_width | picture_height | |
|---|---|---|---|---|---|
| header#2 | 0xff12 | 0x10 | 0x870 | 0x870 | ... | transmission error

| | header_type | size_of_header | picture_width | picture_height | |
|---|---|---|---|---|---|
| header#3 | 0xff12 | 0x100 | 0x000 | 0x870 | ... | transmission error

TRANSMISSION APPARATUS AND RECEPTION APPARATUS FOR PARALLEL DATA STREAMS

CROSS REFERENCE TO RELATED APPLICATIONS

This application is the National Phase of PCT International Application No. PCT/KR2019/005456, filed on May 8, 2019, which is hereby expressly incorporated by reference into the present application.

BACKGROUND

Field of the Disclosure

The present disclosure relates to transmission and reception of a data stream, and more particularly, to an apparatus and method for transmitting a parallel data stream based on wireless communication, and an apparatus and method for receiving a parallel data stream based on wireless communication.

Related Art

With the advent of new applications, there is a growing demand for a technology which wirelessly transmits a data stream consisting of audio, video, pictures, or at least one combination thereof. A device for wirelessly transmitting the data stream and a device for wirelessly receiving the data stream are respectively called a wireless stream (or data) transmitting device and a wireless stream (or data) receiving device. In addition, a system including the wireless stream transmitting device and the wireless stream receiving device is called a wireless stream transceiving system.

The wireless stream transceiving system shall be designed in consideration of several characteristics. First, the wireless stream transceiving system has a time/delay sensitive characteristic. If a probability of a stream transmission error increases depending on a surrounding environment, the error may be recovered generally through packet retransmission. However, in case of an application with a high level of requirements for low latency such as augmented reality (AR) or virtual reality (VR), any part of a frame which is not received within an inter-frame time may be dropped so that the wireless stream receiving device (e.g., a display) can start rendering of a next frame. This is to maintain the low-latency characteristic.

Meanwhile, the wireless stream transceiving system needs to support a high bandwidth due to the advent of a high-quality video (HD, FHD, UHD, etc.) display. However, since the wireless stream transceiving system uses a wireless channel, it is more susceptible to interference than a wired channel. Therefore, when the environment of the wireless channel deteriorates, it may be difficult to provide a quality of service (QoS) guaranteed to transmit a high-quality data stream, and there may be a problem in that a transmission bandwidth decreases.

The data stream may include a bit stream in which audio, video, pictures, or at least one combination thereof is compressed (or encoded). That is, the compressed bit stream may be transmitted/received based on the wireless stream transceiving system. In this case, the wireless stream transmitting device may further include an encoder which compresses the video or the picture, and the wireless stream receiving device may further include a decoder which restores the compressed video or picture.

If a header is lost due to deterioration of wireless channel quality during data stream transmission, a serious picture restoration error or operation interruption may occur in the decoder. Therefore, the wireless stream receiving device may request the wireless stream transmitting device to retransmit the data stream. However, a repeated retransmission request in a network environment in which the wireless channel quality deteriorates causes network overload and performance degradation. In addition, even if a normal header is successfully retransmitted, a delay occurs in all systems until retransmission of the header is complete.

Accordingly, when the compressed bit stream is wirelessly transmitted, there is a need for a method capable of guaranteeing restoration quality greater than or equal to a specific level with respect to a transmission error or loss.

SUMMARY

The present disclosure provides an apparatus and method for transmitting a wireless stream and an apparatus and method for receiving a wireless stream, which are robust to deterioration of a transmission environment and provide a low-latency characteristic.

The present disclosure also provides an apparatus and method for transmitting a wireless stream and an apparatus and method for receiving a wireless stream, in which a compressed bit stream is controlled to be restorable to a specific level even in a situation where a transmission error occurs.

The present disclosure also provides a method of reducing network traffic and recovering an error by utilizing duplicated information of a segmented picture.

The present disclosure also provides an apparatus and method for transmitting a wireless stream, an apparatus and method for receiving a wireless stream, an apparatus and method for encoding a wireless stream, and an apparatus and method for decoding a wireless stream, in which headers with high similarity are transmitted in such a manner that at least some of identical headers are redundantly transmitted or transmission is dropped to reduce a transmission amount of the header.

According to an aspect of the present disclosure, there is provided a wireless stream transmitting device. The device includes an encoder which segments a picture to be input into a plurality of regions and performs encoding on each region to generate a bit stream including a header and data, a data stream (DS) generator which removes at least some of headers for the plurality of regions or modifies the some headers to compact headers, and generates a data stream for each region by combining headers remaining after being removed or the compact header with the data, and a communication unit which generates a packet by packing the data stream, and transmits the packet to a wireless stream receiving device, based on wireless communication.

In an aspect, the DS generator may remove the at least some headers or modify the some headers to the compact headers, based on similarity between the headers for the plurality of regions.

In another aspect, the plurality of regions may include a first region and a second region. If a first header for the first region is identical to a second header for the second region, the DS generator may remove any one of the first header and the second header.

In another aspect, the plurality of regions may include a first region and a second region. If a first header for the first region equally includes some of syntax elements of a second header for the second region, the DS generator may modify the second header to the compact header by removing the some syntax elements from the second header.

In another aspect, the header and the data may be parsed from the bit stream and then be input to the DS generator.

In another aspect, the DS generator may remove the at least some headers or modify the some headers to the compact headers, based on a transmission mode.

In another aspect, the transmission mode may include a first mode to a third mode. The first mode may be a mode in which all of the headers for the plurality of regions are directly transmitted. The second mode may be a mode in which, when the some headers among the headers for the plurality of regions are identical, only one header among the identical some headers is transmitted, and when syntax elements are identical between the some headers, at least one header among the some headers are modified to the compact header. The third mode may be a mode in which, when the some headers among the headers for the plurality of regions are identical, any one header is modified to a first compact header and another header is modified to a second compact header.

In another aspect, the encoder may include a plurality of sub-encoders configured in parallel so that encoding is performed individually on each of the regions.

According to another aspect of the present disclosure, there is provided a wireless stream receiving device. The device may include a communication unit configured to receive a packet for a picture from a wireless stream transmitting device and demodulate the packet to output a data stream including a header and data for each of a plurality of regions constituting the picture, based on wireless communication, a DS processor which, when a header corresponding to a region is not received or the header corresponding to the region is a compact header, restores the header corresponding to the region by using the compact header or a header corresponding to at least another region, and outputs a bit stream including the restored header and the data, and a decoder which decodes the bit stream to restore the picture.

In an aspect, when the header corresponding to the region is not received, the DS processor may restore the header corresponding to the region by copying the header corresponding to the at least another region.

In another aspect, when the header corresponding to the region is the compact header, the DS processor may restore the header corresponding to the region by inserting at least part of a syntax element included in the header corresponding to the at least another region to the compact header.

In another aspect, the DS processor may restore the header corresponding to the region, based on a transmission mode.

In another aspect, the transmission mode may include a first mode to a third mode. The first mode may be a mode in which all of the headers for the plurality of regions are directly transmitted. The second mode may be a mode in which, when the some headers among the headers for the plurality of regions are identical, only one header among the identical some headers is transmitted, and when syntax elements are identical between the some headers, at least one header among the some headers are modified to the compact header. The third mode may be a mode in which, when the some headers among the headers for the plurality of regions are identical, any one header is modified to a first compact header and another header is modified to a second compact header.

In another aspect, the decoder may include a plurality of sub-decoders configured in parallel so that decoding is performed individually on each of the regions.

An application in which real-time is important can reduce a traffic burden and satisfy a low-latency requirement, by using a modified header. In addition, a low-latency wireless compression transmission system can transmit and decode an error-robust compressed stream.

BRIEF DESCRIPTION OF THE DRAWINGS

FIG. 3 is a conceptual diagram illustrating a case where a wireless data transceiving system is implemented with an IEEE 802.11 series communication protocol according to an embodiment.

FIG. 18 illustrates an error recovery operation of a DS processor according to an embodiment.

DESCRIPTION OF EXEMPLARY EMBODIMENTS

Hereinafter, embodiments of a wireless data transmitting device and method and a wireless data receiving device and method are described in detail according to the present disclosure, but the present disclosure is not limited thereto. Features of the present disclosure are described by the illustrated embodiments. However, functions and structures identical or equivalent to the embodiments described in the present specification are included within the spirit and scope of the present disclosure, and may also be achieved by other intended embodiments. Throughout the present specification, like reference numbers indicate like parts or features. Hereinafter, embodiments of the present disclosure will be described in detail with reference to the accompanying drawings.

Recently, a design of a display device such as a TV is becoming more important, and a display panel is gradually becoming thinner with the development of a display panel technology such as OLED. However, there is a limitation in producing and designing a thinner display panel due to a basic thickness of a driving circuit which drives the display panel. Therefore, there is a growing attention for a technique in which the remaining components other than inevitable components to be physically and electrically coupled with the display panel are separated from the display panel and provided in a separate device (hereinafter, referred to as a mainframe device). In this case, the mainframe device and the display device may be configured to mutually exchange a video signal and an audio signal, based on wireless communication. The present disclosure relates to a wireless AV system or wireless display system of which a mainframe device and a display device are physically and/or electrically independent as described above and which mutually reproduces media, based on wireless communication.

Figure 1:
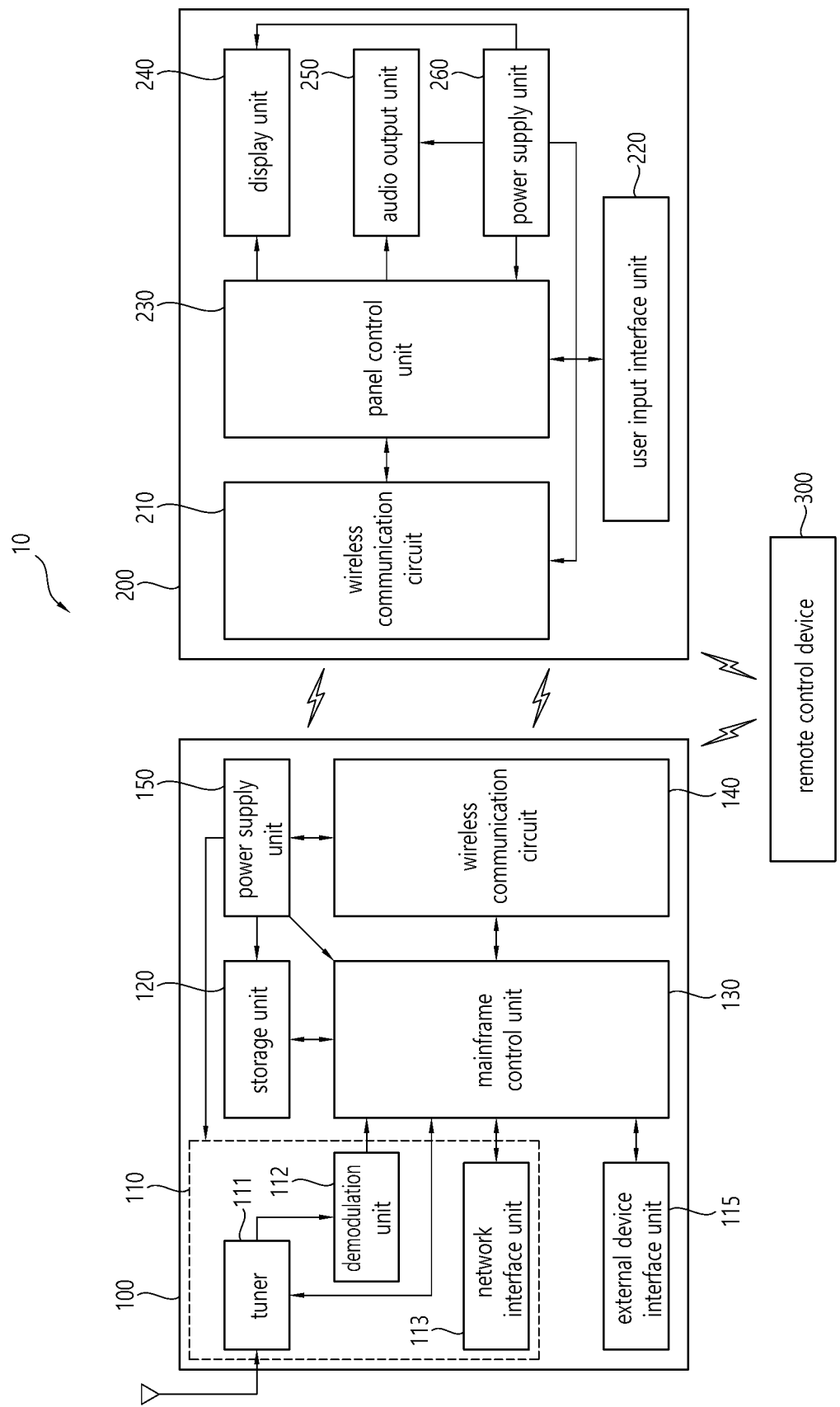
FIG. 1 is a block diagram of a wireless display system according to an embodiment.

FIG. 1 is a block diagram of a wireless AV system according to an embodiment.

Referring to FIG. 1, a wireless AV system 10 may include a mainframe device 100, a display device 200, and a remote control device 300.

The mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

In order to perform such an operation, the mainframe device 100 may include an external signal receiving unit 110, an external device interface unit 115, a storage unit 120, a mainframe control unit 130, a wireless communication circuit 140, and a power supply unit 150.

The external signal receiving unit 110 may include a tuner 111, a demodulation unit 112, and a network interface unit 113.

The tuner 111 receives a wired/wireless-type external signal related to audios, videos, pictures, images, multimedia, or at least one combination thereof. For example, the tuner 111 may select a specific broadcast channel according to a channel selection command and receive a broadcast signal for the selected specific broadcast channel.

The demodulation unit 112 may separate the received external signal into a video signal, an image signal, a picture signal, an audio signal, a data signal related to a broadcast program, or the like, and may restore the separated video signal, image signal, picture signal, audio signal, data signal related to the broadcast program, or the like into a format which can be output.

The external device interface unit 115 may receive an application or an application list in an adjacent external device and transmit it to the mainframe control unit 130 or the storage unit 120.

The external device interface unit 115 may provide a connection path between the mainframe device 100 and the external device. The external device interface unit 115 may receive one or more of audios, videos, pictures, images, multimedia, and at least one combination thereof output from the external device coupled in a wireless or wired manner to the mainframe device 100, and may transfer it to the mainframe control unit 130. The external device interface unit 115 may include a plurality of external input terminals. The plurality of external input terminals may include an RGB terminal, one or more high definition multimedia interface (HDMI) terminals, and a component terminal.

The external device that can be coupled with the external device interface unit 115 may be any one of a set-top box, a Blu-ray player, a DVD player, a game device, a sound bar, a smartphone, a PC, a USB memory, and a home theater, but this is for exemplary purposes only.

The network interface unit 113 may provide an interface for coupling the mainframe device 100 to a wired/wireless network including an Internet network. The network interface unit 113 may transmit or receive data with another user or another electronic device through an accessed network or another network linked to the accessed network.

In addition, part of content data stored in the mainframe device 100 may be transmitted to a selected user or a selected electronic device among the pre-stored other users or other electronic devices.

The network interface unit 113 may access a predetermined webpage through the accessed network or another network linked to the accessed network. That is, data can be transmitted or received with a corresponding server by accessing the predetermined webpage through the network.

In addition, the network interface unit 113 may receive content or data provided by a content provider or a network operator. That is, the network interface unit 113 may receive content such as movies, advertisements, games, VODs, broadcast signals, or the like provided from the content provider or the network operator through the network, and information related to the content.

In addition, the network interface unit 113 may receive update information and update files of firmware provided by the network operator, and may transmit data to the Internet or content provider or the network operator.

The network interface unit 113 may select and receive a desired application among applications open to the public through the network.

The storage unit 120 may store a program for processing and controlling each signal in the mainframe control unit 130, and may store signal-processed video, audio, or data signals.

In addition, the storage unit 120 may perform a function for temporarily storing a picture, audio, or data signal input from the external device interface unit 115 or the network interface unit 113, and may store information related to a predetermined image through a channel memory function.

The storage unit 120 may store an application or an application list input from the external device interface unit 115 or the network interface unit 113.

The mainframe control unit 130 may control the mainframe device 100 by a user command or internal program input through the remote control device 300, and may access the network to download an application desired by a user or an application list into the mainframe device 100.

The mainframe control unit 130 may allow channel information or the like selected by the user to be output through the display device 200 or an audio output unit 250 together with the processed picture or audio signal.

In addition, the mainframe control unit 130 may allow a picture signal or an audio signal, provided from an external device, for example, a camera or a camcorder, input through the external device interface unit 115, to be output through the display device 200 or the audio output unit 250, according to an external device picture playback command received through the remote control device 300.

In addition, the mainframe control unit 130 may provide control to reproduce content stored in the storage unit 120, broadcast content received, and external input content which is input from the outside. The content may have various formats such as a broadcast picture, an external input picture, an audio file, a still picture, an accessed web screen, a text file, or the like.

The mainframe control unit 130 may perform an operation of decoding data or the like related to a video, image, picture, audio, and broadcast program input through the demodulation unit 112, the external device interface unit 115, or the storage unit 120, encoding again the decoded data in accordance with an encoding/decoding scheme supported by the display device 200, generating a data stream or a bit stream by processing data through various picture/audio processing schemes such as compression or encoding so that the encoded data is transmitted through a wireless channel, and transmitting the generated data stream or bit stream to the display device 200 through the wireless communication circuit 140. According to an embodiment, the mainframe control unit 130 may transmit the decoded data again to the display device 200 directly through the wireless communication circuit 140 by bypassing the decoded data without having to encode it in accordance with the encoding/decoding scheme supported by the display device 200.

In addition, the mainframe control unit 130 may be configured to implement functions, procedures, and/or methods of a processor 1130 of a wireless data transmitting device 1100 described in each embodiment of the present specification. Layers of a wireless interface protocol may be implemented in the processor 1130.

The wireless communication circuit 140 is operatively coupled with the mainframe control unit 130 to receive a data stream or a bit stream from the mainframe control unit 130, generates a wireless stream by encoding and/or modulating the data stream or the bit stream so that it can be transmitted through a wireless channel, and transmits the wireless stream to the display device 200. The wireless communication circuit 140 establishes a wireless link, and the mainframe device 100 and the display device 200 are coupled by means of the wireless link. The wireless communication circuit 140 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 140 may perform communication using a communication protocol such as the IEEE 802.11 series standard.

The power supply unit 150 supplies power to the external signal receiving unit 110, the external device interface unit 115, the storage unit 120, the mainframe control unit 130, and the wireless communication circuit 140. A scheme in which the power supply unit 150 receives power from the outside may include a terminal scheme and a wireless scheme. When the power supply unit 150 receives power in a wireless manner, the power supply unit 150 may include a separate component for wirelessly receiving power. For example, the power supply unit 150 may include a power pick-up unit configured to receive wireless power by magnetic coupling with an external wireless power transmitting device, and a separate communication and control unit configured to perform communication with the wireless power transmitting device and control transmission and reception of wireless power.

The wireless communication circuit 140 may also be wirelessly coupled with the remote control device 300 to transfer a signal input by the user to the mainframe control unit 130 or transfer a signal from the mainframe control unit 130 to the user. For example, according to various communication schemes such as Bluetooth, ultra wideband (WB), Zigbee, a radio frequency (RF) communication scheme, or an infra-red (IR) communication scheme, the wireless communication circuit 140 may receive from the remote control device 300 a control signal such as power on/off, screen setting, or the like of the mainframe device 100, or may transmit the control signal from the mainframe control unit 130 to the remote control device 300.

In addition, the wireless communication circuit 140 may transfer to the mainframe control unit 130 a control signal input from a local key (not shown) such as a power key, a volume key, a set value, or the like.

Next, the display device 200 may perform a display or audio output operation after processing a wireless stream received from the mainframe device 100 through a wireless interface according to a reverse process of signal processing performed by the mainframe device 100. In order to perform such an operation, the display device 200 may include a wireless communication circuit 210, a user input interface unit 220, a panel control unit 230, a display unit 240, an audio output unit 250, and a power supply unit 260.

The wireless communication circuit 210 is coupled with the wireless communication circuit 140 of the mainframe device 100 through a wireless link to perform wireless communication with the wireless communication circuit 130 of the mainframe device 100. Specifically, the wireless communication circuit 210 receives a wireless stream from the wireless communication circuit 140 of the mainframe device 100, demodulates the wireless stream, and transmits the demodulated wireless stream to the panel controller 230. The wireless communication circuit 210 may be implemented based on various wireless communication schemes, for example, short-range wireless communication such as WI-FI, Bluetooth, NFC, and RFID, or a mobile communication network (e.g., 3G, 4G, 5G cellular network, etc.). For example, the wireless communication circuit 210 may perform communication using a communication protocol such as the IEEE 802.11 series standard, e.g., IEEE 802.11ay.

The panel control unit 230 decodes a signal demodulated by the wireless communication circuit 210 to restore a bit stream or a data stream. In this case, when the bit stream or data stream is compressed, the panel controller 230 performs an operation of decompressing or restoring the bit stream or data stream, and then outputs signals such as a video signal, an image signal, a picture signal, an audio signal, and a data signal related to a broadcast program. The signals may be sent to the display unit 240, the audio output unit 250, and the user input interface unit 220.

The video signal, the picture signal, the image signal, or the like may be input to the display unit 240 and may be displayed as a picture corresponding to the picture signal. In addition, a picture signal processed by the panel control unit 230 may be transmitted again to the mainframe device 100 through the wireless communication circuit 210, and may be input to an external output device through the external device interface unit 115 of the mainframe device 100.

An audio signal processed by the panel controller 230 may be output to the audio output unit 250. In addition, the audio signal processed by the panel control unit 230 may be transmitted again to the mainframe device 100 through the wireless communication circuit 210, and may be input to the external output device through the external device interface unit 115 of the mainframe device 100.

Meanwhile, the panel control unit 230 may control the display unit 240 to display a picture, for example, may provide control such that a broadcast picture input through the tuner 111, an external input picture input through the external device interface unit 115, a picture input through the network interface unit, or a picture stored in the storage unit 120 is displayed on the display unit 240. In this case, the picture displayed on the display unit 240 may be a still picture or a moving picture, and may be a 2D picture or a 3D picture.

The panel controller 230 may be configured to implement functions, procedures, and/or methods of a processor 1230 of a wireless data receiving device 1200 described in each embodiment of the present specification. In addition, the processor 1230 may be configured to implement functions, procedures, and/or methods of the wireless data receiving device 1200 described in each embodiment of the present specification.

The user input interface 220 may transfer a signal input by the user to the panel control unit 230 or transfer a signal from the panel control unit 230 to the user. For example, according to various communication schemes such as Bluetooth, ultra wideband (WB), Zigbee, a radio frequency (RF) communication scheme, or an infra-red (IR) communication scheme, the user input interface unit 220 may receive from the remote control device 300 a control signal such as power on/off, screen setting, or the like of the display device 200, or may transmit the control signal from the panel control unit 230 to the remote control device 300.

In addition, the user input interface unit 220 may transfer to the panel control unit 230 a control signal input from a local key (not shown) such as a power key, a volume key, a set value, or the like.

The power supply unit 150 supplies power to the wireless communication circuit 210, the user unit interface unit 220, the panel control unit 230, the display unit 240, and the audio output unit 250. A scheme in which the power supply unit 260 receives power from the outside may include a terminal scheme and a wireless scheme. When the power supply unit 260 receives power in a wireless manner, the power supply unit 260 may include a separate component for wirelessly receiving power. For example, the power supply unit 260 may include a power pick-up unit configured to receive wireless power by magnetic coupling with an external wireless power transmitting device, and a separate communication and control unit configured to perform communication with the wireless power transmitting device and control transmission and reception of wireless power.

The remote control device 300 performs an operation in which the mainframe device 100 and/or the display device 200 remotely control power on/off, channel selection, screen setting, or the like, and may be referred to as a remote controller.

Meanwhile, since the mainframe device 100 and display device 200 of FIG. 1 are only one embodiment of the present specification, some of components illustrated herein may be integrated, added, or omitted according to specifications of the mainframe device 100 and display device 200 actually implemented. That is, if necessary, two or more components may be combined into one component, or one component may be subdivided into two or more components. In addition, a function performed in each block is for explaining the embodiments of the present disclosure, and a specific operation or device does not limit the scope of the present disclosure.

According to another embodiment of the present disclosure, unlike in FIG. 1, the mainframe device 100 does not include the tuner 111 and the demodulation unit 112, and may receive a picture through the network interface unit 113 or the external device interface unit 115 to reproduce the picture.

For example, the mainframe device 100 may be implemented by being divided into a picture processing device such as a set-top box or the like for receiving a broadcast signal or content according to various network services and a content reproducing device for reproducing content input from the picture processing device.

In this case, a method of operating the wireless AV system 10 according to an embodiment of the present disclosure to be described below may be performed by not only the mainframe device 100 and the display device 200 as described with reference to FIG. 1 but also any one of a picture processing device such as the separate set-top box or the like and a content reproducing device having the audio output unit 250.

In terms of system input/output, the mainframe device 100 may be referred to as a wireless source device which provides a source wirelessly, and the display device 200 may be referred to as a wireless sink device which receives the source wirelessly. The wireless source device and the wireless sink device may implement wireless display (WD) communication techniques compatible with standards such as wireless HD, wireless home digital interface (WHDI), WiGig, wireless USB, and Wi-Fi display (WFD) (also known as Miracast).

In terms of an application, the mainframe device 100 may be integrated in a form of constituting part of a wireless set-top box, a wireless gaming console, a wireless digital video disk (DVD) player, and a wireless writer. In this case, the mainframe device 100 may be provided in a form of a wireless communication module or chip. In addition, the display device 200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the display device 200 may be provided in a form of a wireless communication module or chip.

The mainframe device 100 and the display device 200 may be integrated in a form of constituting part of a mobile device. For example, the mainframe device 100 and the display device 200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the mainframe device 100 and the display device 200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

As described above, the mainframe device 100 may perform an operation of receiving a wired/wireless-type external signal related to audios, videos, pictures, images, multimedia, or at least one combination thereof, generating a data stream or bit stream by processing the received external signal in various manners, and transmitting it to the display device 200 through a wireless interface.

Hereinafter, the picture/video/audio data transmitted through the wireless interface is collectively referred to as wireless data. That is, the mainframe device 100 may communicate wirelessly with the display device 200 and transmit wireless data. Therefore, in terms of a wireless data transceiving system 1000, the mainframe device 100 may be referred to as the wireless data transmitting device 1100, and the display device 200 may be referred to as the wireless data receiving device 1200. Hereinafter, the present disclosure will be described in greater detail in terms of the wireless data transceiving system 1000. First, a detailed block diagram of the wireless data transceiving system 1000 is disclosed.

Figure 2:
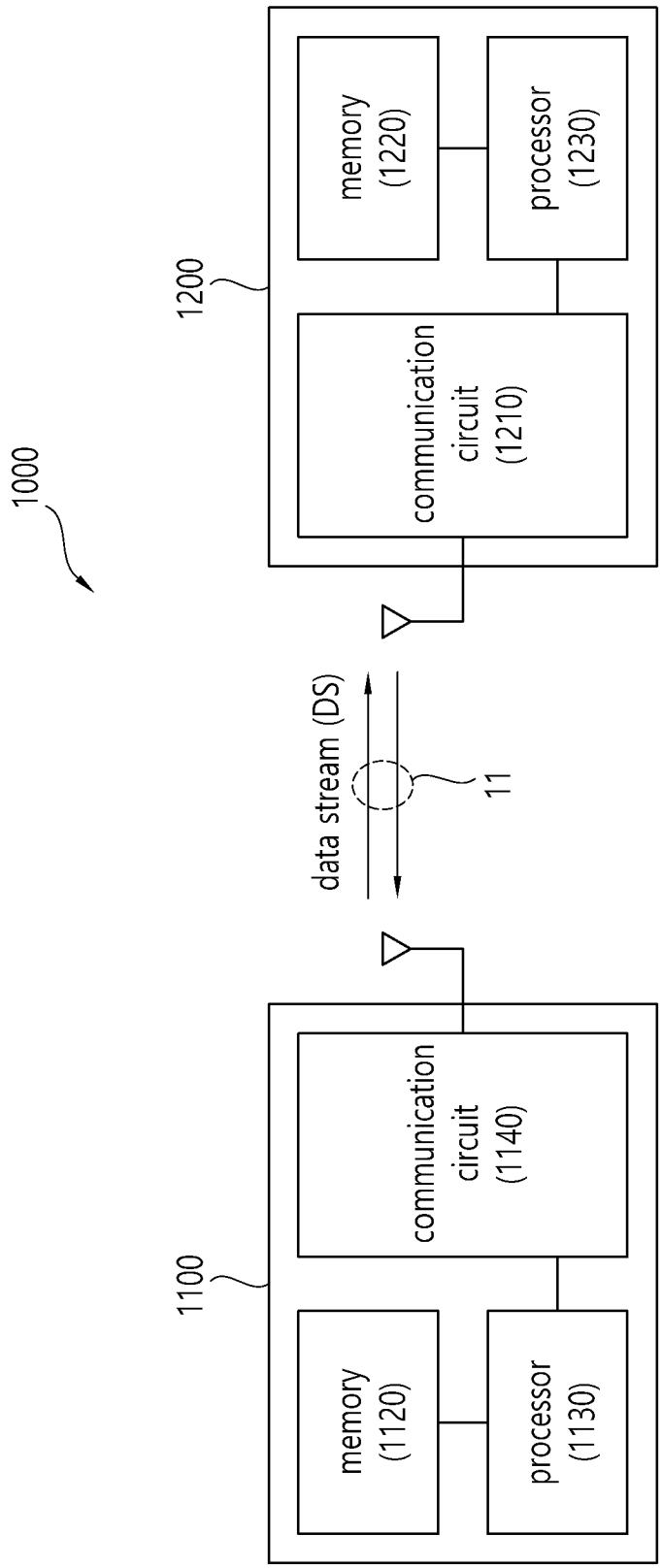
FIG. 2 is a block diagram of a wireless data transceiving system according to an embodiment.

FIG. 2 is a block diagram of a wireless data transceiving system according to an embodiment.

Referring to FIG. 2, the wireless data transceiving system 1000 refers to a system for transmitting and receiving a data stream wirelessly, and includes the wireless data transmitting device 1100 and at least one wireless data receiving device 1200. The wireless data transmitting device 1100 is communicatively coupled with the at least one wireless data receiving device 1200.

In an aspect, data may include audios, videos, pictures, images, and multimedia, or may be constructed of at least one combination thereof.

In another aspect, the data may include a bit stream of an audio-compressed format, a bit stream of a video-compressed format, a bit stream of a picture-compressed format, and a bit stream of a multimedia-compressed format, or may include at least one combination thereof. In this case, the wireless data transceiving system 1000 may also be referred to as a wireless compressed data stream transceiving system. In addition, the wireless compressed data stream transceiving system 1000 may further include a functional or physical unit for compressing data.

Regarding a detailed structure of each device, the wireless data transmitting device 1100 includes a memory 1120, a processor 1130, a communication circuit 1140, and the wireless data receiving device 1200 includes a communication circuit 1210, a memory 1220, a processor 1230.

The processor 1130 may be configured to implement functions, procedures, and/or methods of the wireless data transmitting device 1100 described in each embodiment of the present specification. In addition, the processor 1230 may be configured to implement functions, procedures, and/or methods of the wireless data receiving device 1200 described in each embodiment of the present specification. Layers of the wireless interface protocol may be implemented in the processors 1130 and 1230.

In terms of the display system of FIG. 1, the processor 1130 may be configured to perform a function of the mainframe control unit 130. For example, the processor 1130 may perform an operation of decoding data or the like related to a video, image, picture, audio, and broadcast program input through the demodulation unit 112, the external device interface unit 115, or the storage unit 120, generating a data stream or a bit stream by processing data through various picture/audio processing schemes such as compression or encoding so that the decoded data is transmitted through a wireless channel, and transmitting the generated data stream or bit stream to the display device 200 through the communication circuit 1140.

The memories 1120 and 1220 may be implemented inside the processors 1130 and 2310. Alternatively, the memories 1120 and 1220 may be implemented outside the processor 2310, and may be coupled to the processors 1130 and 1230 in a communicable manner by using various well-known means.

The communication circuits 1140 and 1210 are operatively coupled to the processors 1130 and 1230, and transmit and/or receive data wirelessly. A communication channel constituting a radio link 11 may be a communication channel of a relatively short range, or may be a communication channel implemented using a physical channel structure such as Wi-Fi, Bluetooth, or the like which uses various frequencies such as 2.4 GHz, 3.6 GHz, 5 GHz, 60 GHz, or ultra wide band (UWB). For example, the communication circuits 1140 and 1210 may be implemented based on various wireless communication schemes, such as short-range wireless communication, e.g., WI-FI, Bluetooth, NFC, and RFID, or a mobile communication network (e.g., 3G, 4G, 5G cellular network, etc.), or may perform communication by using a communication protocol such as the IEEE 802.11 series standard.

FIG. 3 is a conceptual diagram illustrating a case where a wireless data transceiving system is implemented with an IEEE 802.11 series communication protocol according to an embodiment.

Referring to FIG. 3, a wireless data transceiving system 20 of FIG. 3(A) may include one or more basic service sets (hereinafter, referred to as 'BSSs') 21 and 25. The BSS is a set of access points (hereinafter, APs) and stations (hereinafter, STAs) that can successfully synchronize and communicate with each other and is not a concept indicating a specific region.

For example, the first BSS 21 may include a first AP 22 and one first STA 21-1. The second BSS 25 may include a second AP 26 and one or more STAs 25-1 and 25-2. Herein, the first AP 22 may correspond to the communication circuit 1140 of FIG. 2, and the one or more STAs 25-1 and 25-2 may correspond to the communication circuit 1210 of FIG. 2.

The infrastructure BSSs 21 and 25 may include at least one STA, the APs 22 and 26 providing a distribution service, and a distribution system 27 for connecting the plurality of APs.

The distribution system 27 may connect the plurality of BSSs 22 and 26 to implement an extended service set (hereinafter, 'ESS') 28. The ESS 28 may be used as a term indicating one network to which the one or more APs 22 and 26 are connected through the distribution system 27. At least one AP included in one ESS 28 may have the same service set identification (hereinafter, SSID).

A portal 29 may serve as a bridge for connecting the WLAN network (IEEE 802.11) with another network (e.g., 802.X).

In a WLAN having a structure as shown in FIG. 3(A), a network between the APs 22 and 26 and a network between the APs 22 and 26 and the STAs 21-1, 25-1, and 25-2 may be implemented.

Meanwhile, a wireless data transceiving system 30 of FIG. 3(B) may perform communication by setting a network between STAs without the APs 22 and 26, unlike FIG. 3(A). A network that performs communication by setting a network even between STAs without the APs 22 and 26 is defined to an ad-hoc network or an independent basic service set (hereinafter, 'BSS').

Referring to FIG. 3(B), the wireless data transceiving system 30 is a BSS that operates in an Ad-Hoc mode, i.e., IBSS. Since the IBSS does not include an AP, there is no centralized management entity. Therefore, in the wireless data transceiving system 30, STAs 31-1, 31-2, 31-3, 32-4, and 32-5 are managed in a distributed manner. Herein, the STAs 31-1, 31-2, 31-3, 32-4, and 32-5 may correspond to the communication circuit 1140 or communication circuit 1210 of FIG. 2.

All of the STAs 31-1, 31-2, 31-3, 32-4, and 32-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the institute of electrical and electronics engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

Figure 4:
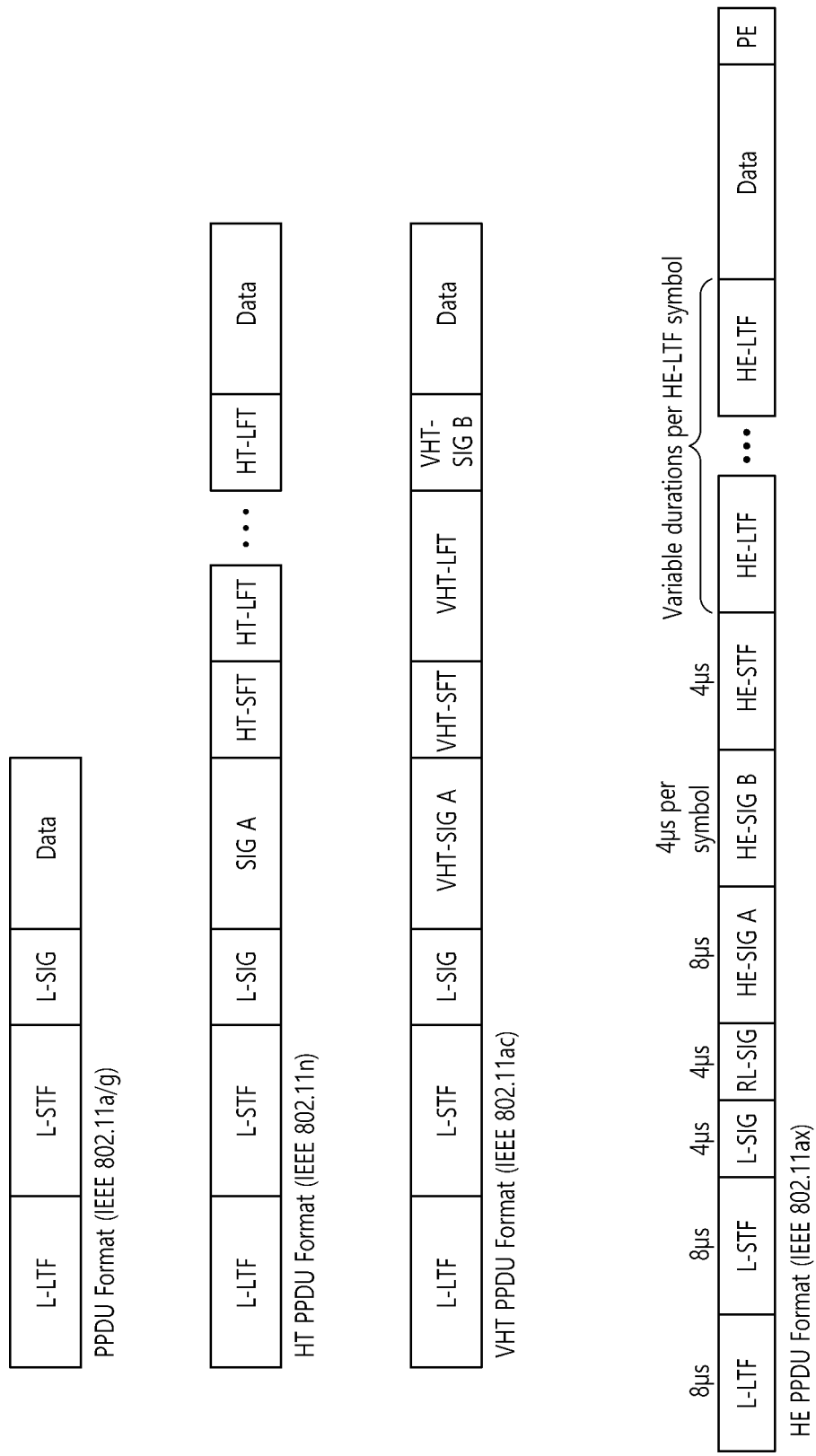
FIG. 4 illustrates a PPDU format used in an IEEE standard according to an embodiment.

FIG. 4 illustrates a PPDU format used in an IEEE standard according to an embodiment.

Referring to FIG. 4, various types of PHY protocol data units (PPDUs) are used in the standard such as IEEE a/g/n/ac or the like. Specifically, LTF and SFT fields include a training signal, SIG-A and SIG-B include control information for a receiving STA, and a data field includes user data corresponding to a PSDU.

A data stream or information on the data stream according to the present specification may be applied on a high efficiency (HE) PPDU conforming to the IEEE 802.11ax standard. That is, the data stream or the information on the data stream according to the present specification may be included in HE-SIG-A and/or HE-SIG-B included in the HE PPDU. The HE-SIG-A and the HE-SIG-B may also be represented as SIG-A and SIG-B, respectively. However, the data stream or the information on the data stream according to the present specification is not necessarily limited to being applied only to an HE-SIG-A and/or HE-SIG-B standard, and may be applied to control/data fields having various names, which include control information in a wireless communication system transferring user data.

In addition, the HE PPDU of FIG. 4 is an example of a PPDU for multiple users. HE-SIG-B is included only for the multiple users. The HE-SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during illustrated time periods (i.e., 4 or 8 μs).

A PPDU that is used in the IEEE standard is described as a PPDU structure being transmitting mainly on a channel bandwidth of 20 MHz. A PPDU structure that is transmitted on a bandwidth (e.g., 40 MHz, 80 MHz) wider than the channel bandwidth of 20 MHz may be a structure in which linear scaling is applied to the PPDU structure being used in the channel bandwidth of 20 MHz.

The PPDU that is used in the IEEE standard is generated based on 64-fast Fourier transform (FFT), and a cyclic prefix (CP) portion may be ¼. In this case, a length of a valid symbol duration (or FFT duration) may be equal to 3.2 us, a CP length may be equal to 0.8 us, and a symbol duration may be equal to 4 us (=3.2 us+0.8 us), which is a sum of the length of the valid symbol duration and the CP length Returning to FIG. 2, a communication channel constituted by the communication units 1140 and 1210 may be a network communication channel. In this case, the communication units 1140 and 1210 may establish a tunneled direct link setup (TDLS) which is tunneled to avoid or reduce network congestion. The Wi-Fi direct and the TDLS are used to set up relatively short-range communication sessions. A communication channel constituting a radio link 11 may be a communication channel of a relatively short range, or may be a communication channel implemented using a physical channel structure such as Wi-Fi, Bluetooth, or the like which uses various frequencies such as 2.4 GHz, 3.6 GHz, 5 GHz, 60 GHz, or ultra wide band (UWB).

Although techniques disclosed in the present specification may be primarily described in association with a communication protocol such as an IEEE 802.11 series standard, aspects of these techniques may also be compatible with other communication protocols. By way of example and without limitation, wireless communication between the communication units 1140 and 1210 may use orthogonal frequency division multiplexing (OFDM) techniques. It is also possible to use various other wireless communication techniques including, but not limited to, time division multiple access (TDMA), frequency division multiple access (FDMA), code division multiple access (CDMA), or any combination of OFDM, FDMA, TDMA and/or CDMA.

The processors 1130 and 1230 may include application-specific integrated circuits (ASICs), other chipsets, logic circuits, and/or data processors. The memories 1120 and 1220 may include a read-only memory (ROM), a random access memory (RAM), a flash memory, a memory card, a storage medium, and/or other equivalent storage devices. The communication units 1140 and 1210 may include a baseband circuit for processing a radio frequency signal. When the embodiment is implemented in software, the techniques explained in the present specification may be implemented with a module (i.e., procedure, function, etc.) for performing the functions explained in the present specification. The module may be stored in the memories 1120 and 1220 and may be performed by the processors 1130 and 2310. The memories 1120 and 1220 may be implemented inside the processors 1130 and 2310. Alternatively, the memories 1120 and 1220 may be implemented outside the processor 2310, and may be coupled to the processors 1130 and 1230 in a communicable manner by using various well-known means.

In terms of input/output of a data stream, the wireless stream transmitting device 1100 may be referred to as a wireless source device which provides a source wirelessly, and the wireless stream receiving device 1200 may be referred to as a wireless sink device which receives the source wirelessly. The wireless source device and the wireless sink device may implement wireless display (WD)

communication techniques compatible with standards such as wireless HD, wireless home digital interface (WHDI), WiGig, wireless USB, and Wi-Fi Display (WFD) (also known as Miracast).

In terms of an application, the wireless stream transmitting device 1100 may be integrated in a form of constituting part of a wireless set-top box, a wireless gaming console, a wireless digital video disk (DVD) player, and a wireless writer. In this case, the wireless stream transmitting device 1100 may be provided in a form of a wireless communication module or chip. In addition, the wireless stream receiving device 1200 may be integrated in a form of constituting part of a user device or electronic device (e.g., a wireless TV, a wireless monitor, a wireless projector, a wireless printer, a wireless vehicle dashboard display, a wearable device, an augmented reality (AR) headset, a virtual reality (VR) headset, etc.) having a display panel for displaying an image or a video. In this case, the wireless stream receiving device 1200 may be provided in a form of a wireless communication module or chip.

The wireless stream transmitting device 1100 and the wireless stream receiving device 1200 may be integrated in a form of constituting part of a mobile device. For example, the wireless stream transmitting device 1100 and the wireless stream receiving device 1200 may be integrated into a mobile terminal including smartphones, smart pads, or tablets, or other types of wireless communication devices, portable computers having wireless communication cards, a personal digital assistant (PDA), a portable media player, a digital image capturing device such as a camera or a camcorder, or other flash memory devices having wireless communication capabilities. In this case, the wireless stream transmitting device 1100 and the wireless stream receiving device 1200 may be provided in a form of a wireless communication module or chip.

A smartphone user may stream or mirror a video or audio output by a user's smartphone, tablet, or other computer devices to another device such as a television or projector capable of providing a higher resolution display or other enhanced user experiences.

Hereinafter, an error-robust low-latency wireless compressed data stream transmitting system will be described in greater detail.

Figure 5A:
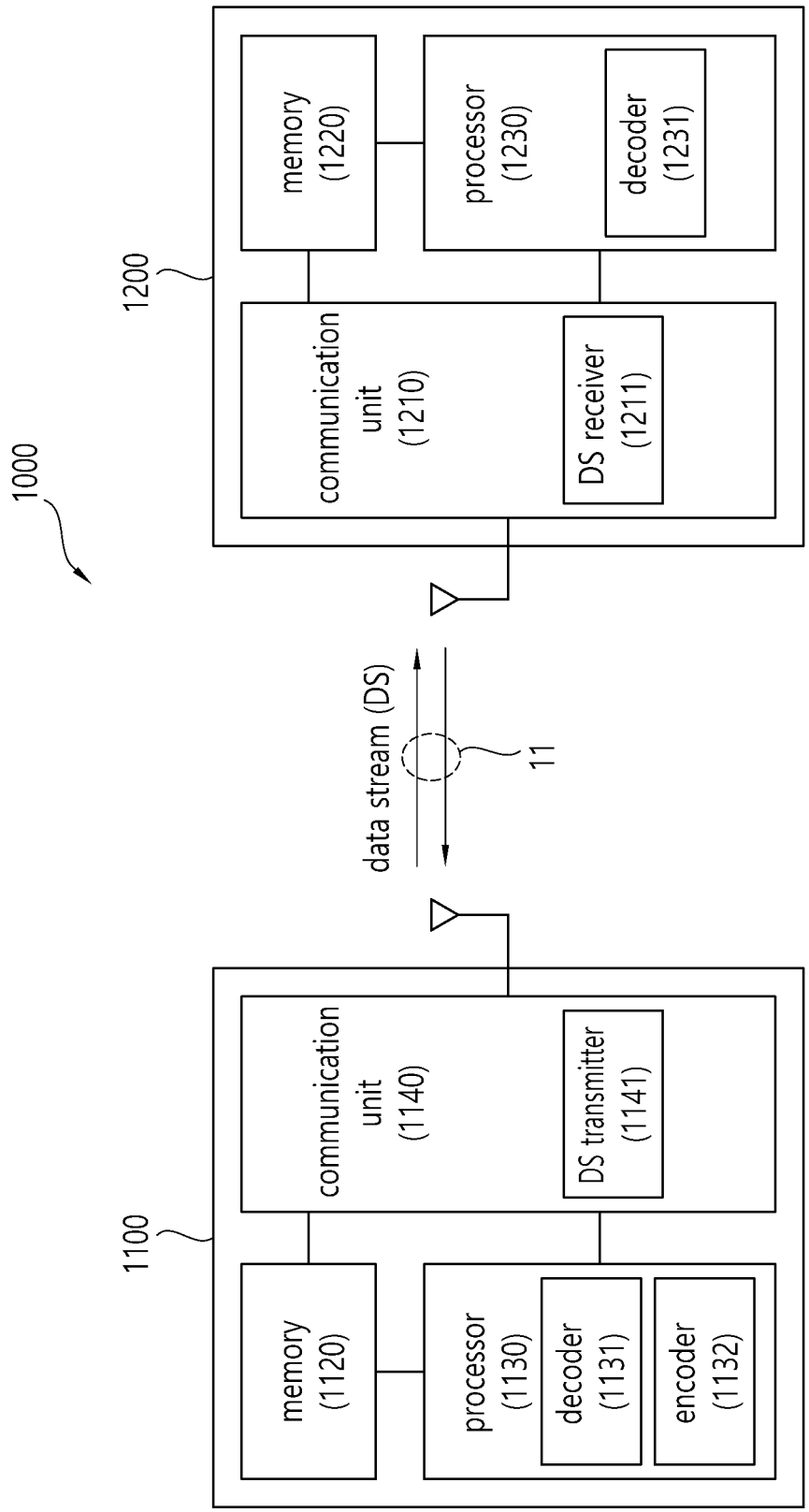
FIG. 5a is a block diagram illustrating a wireless stream transceiving system according to another embodiment.

FIG. 5*a* is a block diagram illustrating a wireless stream transceiving system according to another embodiment. Each component of the wireless stream transceiving system 1000 of FIG. 2 is illustrated in greater detail in FIG. 5*a*.

Referring to FIG. 5*a*, a processor 1130 of a wireless stream transmitting device 1100 includes a decoder 1131 and an encoder 1132, and a communication unit 1140 of the wireless stream transmitting device 1100 includes a data stream (DS) transmitter 1141. Although it is illustrated that the decoder 1131 and the encoder 1132 constitute one element of a structure constituting the processor 1130, the decoder 1131 and the encoder 1132 may be one element of a function performed by the processor 1130. That is, the encoder 1132 may exist as a function such as a compression or encoding algorithm or compression or encoding program performed by the processor 1130. Similarly, although it is illustrated that the DS transmitter 1141 constitutes one element of a structure constituting the communication unit 1140, the DS transmitter 1141 may be a physical layer or MAC layer of a radio interface layer constituting the communication unit 1140 or may be one element of a function performed by the physical layer or MAC layer. That is, the DS transmitter 1141 may exist as a function such as DS information generation and transmission performed by the physical layer or MAC layer.

In addition, a processor 1230 of the wireless stream receiving device 1200 includes the decoder 1231, and a communication unit 1210 of the wireless stream receiving device 1200 includes a DS receiver 1211. Although it is illustrated that the decoder 1231 constitutes one element of a structure constituting the processor 1230, the decoder 1231 may be one element of a function performed by the processor 1230. That is, the decoder 1231 may exist as a function such as a restoration or decoding algorithm or restoration or decoding program performed by the processor 1230. Similarly, although it is illustrated that the DS receiver 1211 constitutes one element of a structure constituting the communication unit 1210, the DS receiver 1211 may be a physical layer or MAC layer of a radio interface layer constituting the communication unit 1210 or may be one element of a function performed by the physical layer or MAC layer. That is, the DS receiver 1211 may exist as a function such as DS information reception and demodulation performed by the physical layer or MAC layer.

Hereinafter, a function of each component and an operation, procedure, and characteristic thereof will be described in greater detail.

The encoder 1132 of the wireless stream transmitting device 1100 compresses or encodes media (audio or video or images or pictures, or at least one combination thereof) to be input, outputs a compressed bit stream, and inputs the compressed bit stream to the DS transmitter 1141.

The media to be input is compressed or encoded with various formats.

As an example, if the media to be input is an image, the compressed bit stream to be output may be a bit stream compressed with a JPEG-XS format. In this case, the encoder 1132 may be a JPEG-XS codec. The JPEG-XS codec is a codec defined in an ISO/IEC 21122 standard for a low-latency, low-power image compression format optimized for real-time streaming. Of course, various image compression/encoding schemes including the JPEG-XS format may be used to compress or encode an image according to the present embodiment, and the present embodiment includes a bit stream generated according to such various embodiments.

As another example, if the media to be input is a picture or video, the compressed bit stream to be output may be a data stream of the JPEG-XS format or HEVC (or H.265) format. Of course, various picture/video compression or encoding schemes including the JPEC-XS format or HEVC (or H.265) may be used to compress or encode a picture or video according to the present embodiment, and the present embodiment includes a bit stream generated according to such various embodiments.

Figure 5B:
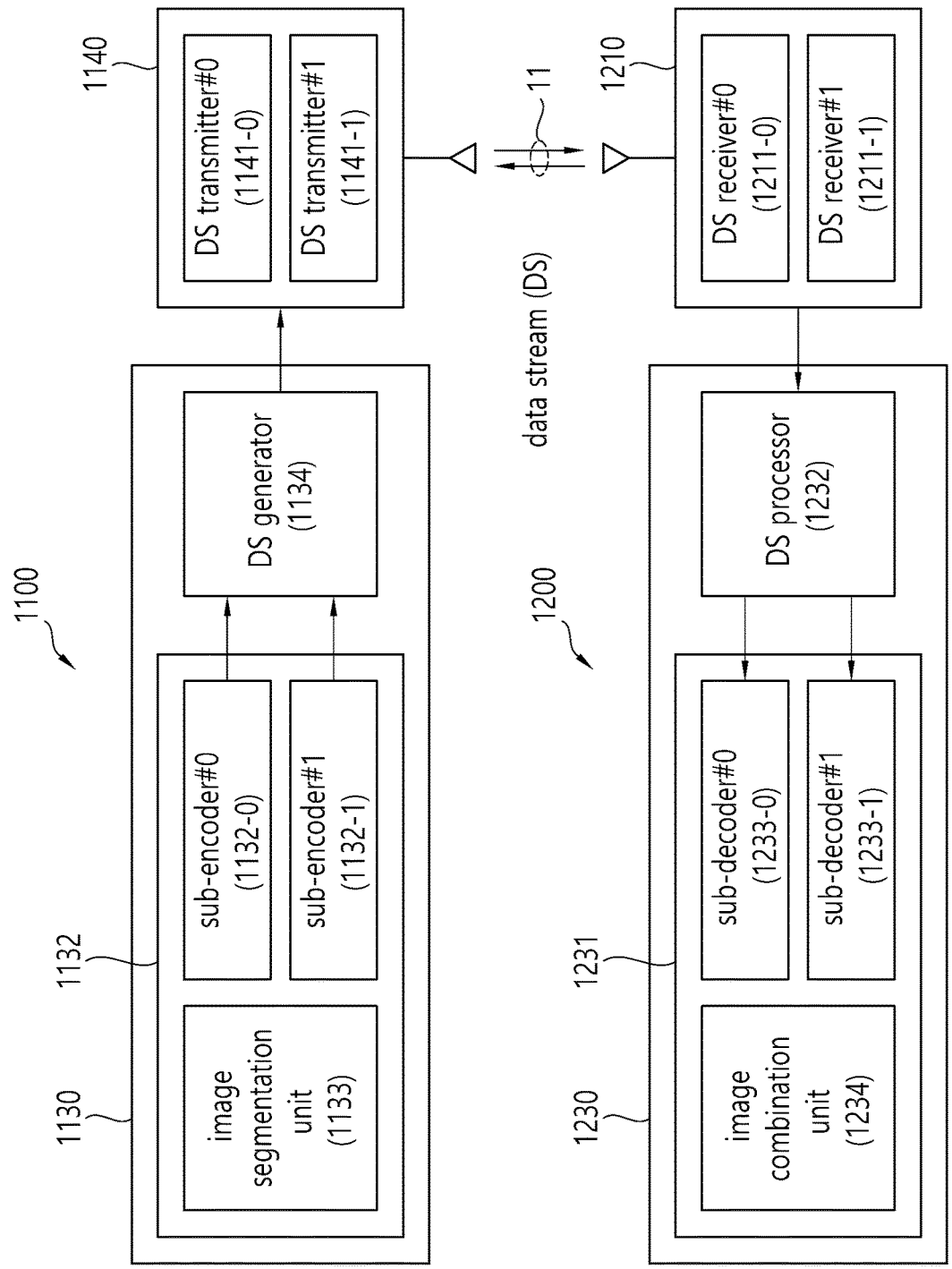
FIG. 5b is a block diagram illustrating a processor and communication unit of a wireless stream transmitting device and receiving device according to an embodiment.

FIG. 5*b* is a block diagram illustrating a processor and communication unit of a wireless stream transmitting device and receiving device according to an embodiment. Each component of the processors 1130 and 1230 and communication units 1140 and 1210 of FIG. 2 and FIG. 5*a* is illustrated in greater detail in FIG. 5*b*. For convenience of explanation, the memories 1120 and 1220 are omitted.

Referring to FIG. 5*b*, the processor 1130 of the wireless stream transmitting device 1100 may further include the encoder 1132 and a data stream (DS) generator 1134.

First, the encoder 1132 may include an image segmentation unit 1133 which segments a picture to be input into a plurality of regions, and a plurality of sub-encoders 1132-0 and 1132-1 configured in parallel to generate a bit stream including a header and data representing a pixel for each region by performing individual or parallel encoding on each region. For example, the number of sub-encoders included in the encoder 1132 may be equal to the number of pictures segmented from one picture. The plurality of sub-encoders 1132-0 and 1132-1 may be physically separated engines. Alternatively, the encoder 1132 may process encoding for the plurality of regions in parallel by using a plurality of virtual encoding engines as a single encoder. Although only two sub-encoders #0 and #1 are illustrated in FIG. 5b, this is for exemplary purposes only. Thus, the encoder 1132 may include only one sub-encoder, or may include two or more sub-encoders. In general, in consideration of importance of data, a header of a bit stream may be managed by a different algorithm through a channel separate from (pixel) data.

Figure 6A:
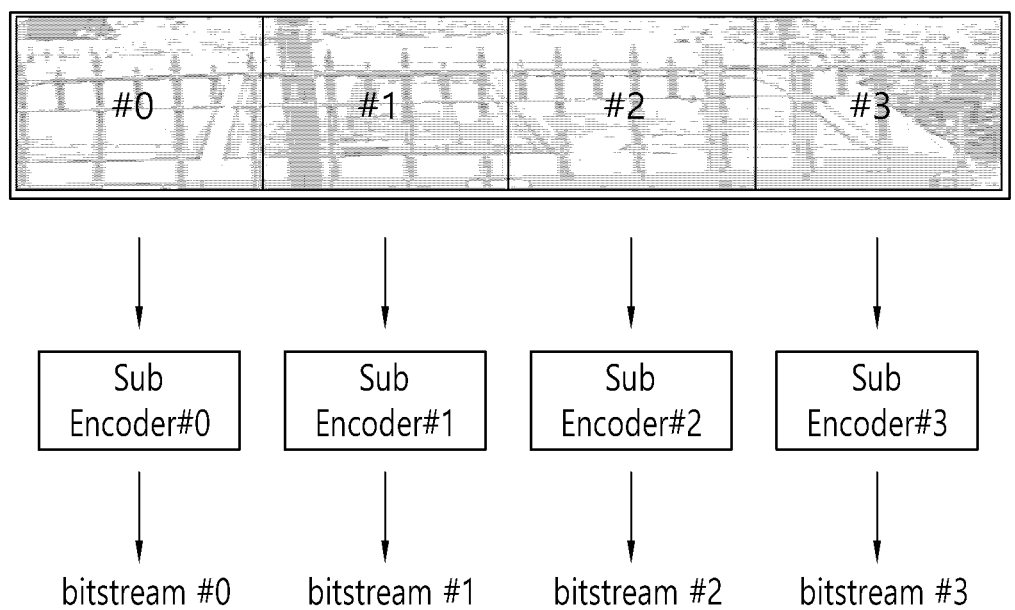
FIG. 6a and FIG. 6b illustrate an example of an operation in which one picture is segmented into a plurality of regions and encoding is performed on each region.
Figure 6B:
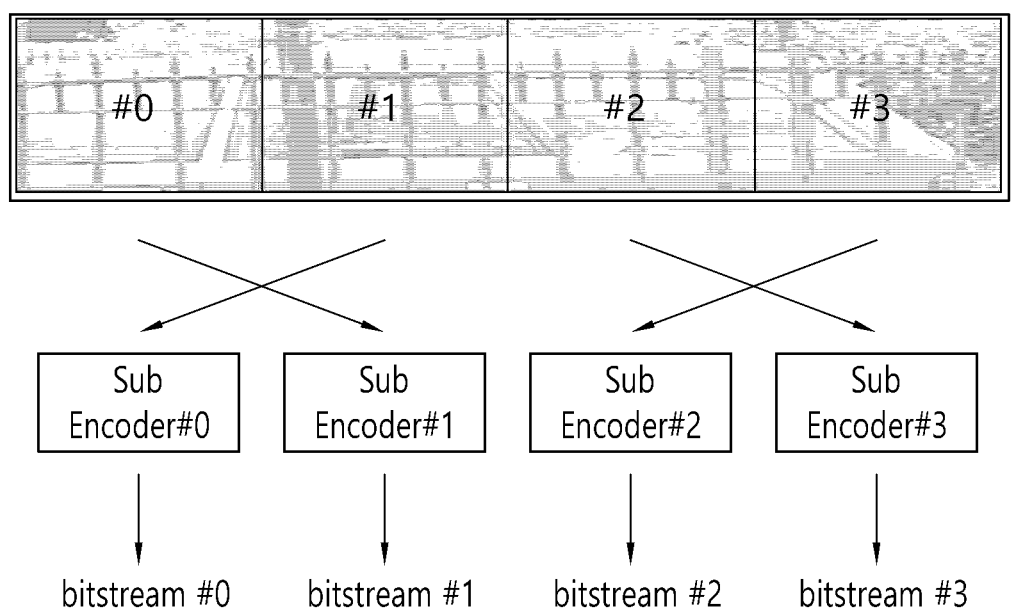

FIG. 6a and FIG. 6b illustrate an example of an operation in which one picture is segmented into a plurality of regions and encoding is performed on each region.

Referring to FIG. 6a and FIG. 6b, for example, the image segmentation unit 1133 segments one picture into four regions, and four sub-encoders #0, #1, #2, and #3 perform encoding on the four regions.

As an example, as shown in FIG. 6a, one sub-encoder may be fixed to a specific region to perform encoding on the specific region. That is, the sub-encoders may process a region of a position (or a region of an index) pre-defined by an encoding/decoding system.

For example, the sub-encoders #0, #1, #2, and #3 fixedly correspond to regions #0, #1, #2, and #3, respectively, in a 1:1 manner. The sub-encoder #0 performs encoding on the region #0 to generate a bit stream #0. The sub-encoder #1 performs encoding on the region #1 to generate a bit stream #1. The sub-encoder #2 performs encoding on the region #2 to generate a bit stream #2. The sub-encoder #3 performs encoding on the region #3 to generate a bit stream #3.

As another example, as shown in FIG. 6b, one sub-encoder may perform encoding on any region, without having to be fixed to a specific region. In this case, a region to be encoded by a sub-encoder may be explicitly indicated within a bit stream or by an external device.

The sub-encoders #1, #0, #3, and #2 correspond to the regions #0, #1, #2, and #3, respectively. Therefore, the sub-encoder #0 performs encoding on the region #1 to generate the bit stream #0. The sub-encoder #1 performs encoding on the region #0 to generate the bit stream #1. The sub-encoder #2 performs encoding on the region #3 to generate the bit stream #2. The sub-encoder #3 performs encoding on the region #2 to generate the bit stream #3.

As described above, the bit streams generated in the respective sub-encoders include independent headers and data. That is, the bit streams generated in the respective sub-encoders may be independently decoded. Image segmentation in the present disclosure is a system-dependent, and there are no restrictions such as a minimum number and a maximum number. In addition, a width and a height may be different between segmented pictures.

Figure 7:
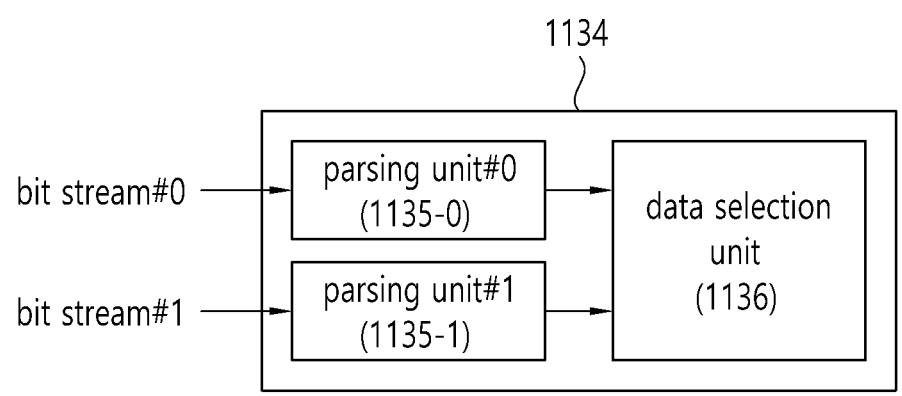
FIG. 7 is a block diagram illustrating a DS generator according to an embodiment.

Returning to FIG. 5b, the DS generator 1134 performs operations of parsing each of bit streams obtained as a result of performing encoding on each region into a header and data, removing at least some headers header or modifying the some headers to compact headers, and generating a data stream for each region by combining the remaining header after being removed or the compact header with the data. Herein, the DS generator 1134 may remove the at least part of the header or modify the header to the compact header, based on similarity between headers of bit streams belonging to different regions. In order to perform this function, the DS generator 1134 may include one or more parsing units 1135-0 and 1135-1 and a data selection unit 1136 as shown in FIG. 7.

Figure 8:
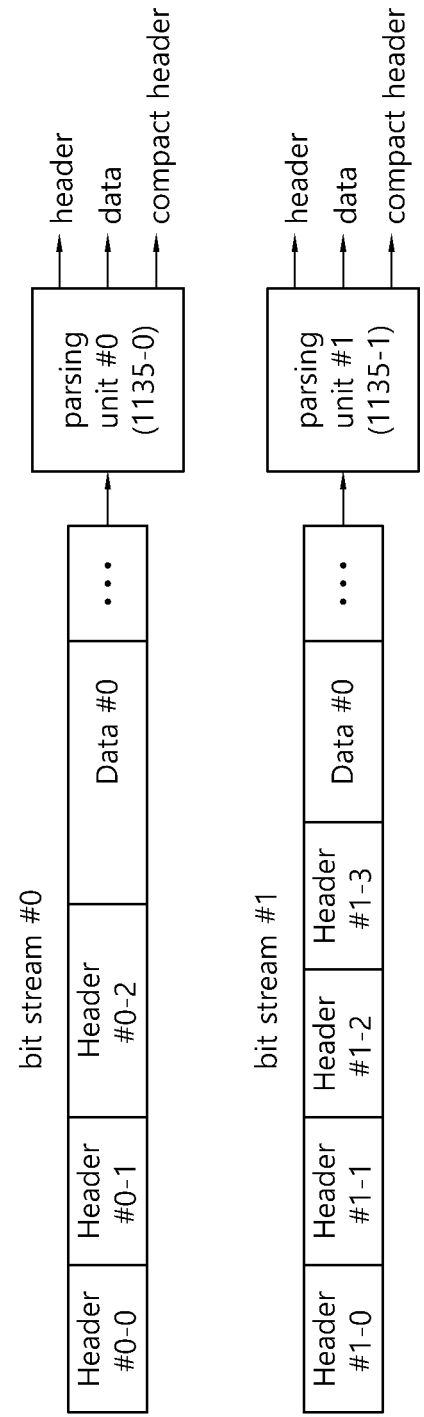
FIG. 8 is a block diagram illustrating a DS generator including a parsing unit and a data selection unit according to an embodiment.

FIG. 8 is a block diagram illustrating a DS generator including a parsing unit and a data selection unit according to an embodiment.

Referring to FIG. 8, it is assumed for example that one picture is segmented into two regions #0 and #1, and bit streams #0 and #1 are generated for the respective regions. For example, the bit stream #0 may include a header #0-0, a header #0-1, a header #0-2, and data #0, . . . , and the bit stream #1 may include a header #1-0, a header #1-1, a header #1-2, a header #1-3, and data #0, . . . . The bit stream #0 is input to a parsing unit #0 1135-0, and the bit stream #1 is input to a parsing unit #1 1135-1.

The parsing unit #0 1135-0 parses or segments the bit stream #0 into a header, data, and a compact header. Similarly, the parsing unit #1 1135-1 parses or segments the bit stream #1 into a header, data, and a compact header. That is, the parsing unit generates the header, the data, and the compact header from the bit stream to be input. However, an output of the parsing unit is not always determined as a combination of the header, the data, and the compact header as in the present embodiment, and thus part of the data may be omitted according to the bit stream to be input. Accordingly, the parsing unit may generate at least one or two combinations of the header, the data, and the compact header. The DS generator 1134 may use a separate buffer for storing the header, data, compact header, or the like generated by the parsing unit.

The header is a sort of control information or metadata including a picture and syntax elements related to encoding. In the present specification, the header may mean not only a header defined in the standard but also an arrangement of a series of meaningful bits in which inter-stream duplication occurs. Therefore, a position of the header is not limited to a front position in the bit stream as shown in FIG. 8. For example, the header may be located between data, and the entire bit stream may include only the header or only the data.

The compact header may mean a header in which some syntax elements are removed from an original header. The compact header may also be called a compressed header. Hereinafter, a method in which the DS generator 1134 generates the compact header, based on parsing, will be described in greater detail.

The DS generator 1134 may modify the at least some headers to the compact headers or remove the at least some headers, based on similarity between headers of bit streams belonging to different regions.

For example, it is assumed that the header #0-0 of the bit stream #0 includes syntax elements of Table 1, and the header #1-0 of the bit stream #1 includes syntax elements of Table 2.

TABLE 1

| Syntax element | Value |
| --- | --- |
| header_type | 0xff12 |
| size_of_header | 0x100 |
| picture_width | 0x870 |
| picture_height | 0x870 |
| profile | 0 |
| slice_height | 0x10 |
| precision | 0x00 |

TABLE 2

| Syntax element | Value |
| --- | --- |
| header_type | 0xff12 |
| size_of_header | 0x100 |
| picture_width | 0x770 |
| picture_height | 0x870 |
| profile | 0 |
| slice_height | 0x10 |
| precision | 0x00 |

Referring to Table 1 and Table 2, each header may include syntax elements such as header_type, size_of_header, picture_width, picture_height, profile, slice_height, and precision.

As such, when one picture may be segmented into a plurality of regions and each region is subjected to parallel encoding to generate independent bit streams, each bit stream may have an independent header. However, since each region is encoded with the same technology to guarantee uniform image quality between frames, there is a very high probability that headers of different bit streams are substantially similar. That is, in a system in which one picture is segmented and encoded, similar information is generated in a great amount between respective bit streams. For example, comparing Table 1 and Table 2, the header #0-0 and the header #1-0 have different picture width values of 0x870 and 0x770, respectively, but all of the remaining 6 syntax elements have the same value.

If the header #0-0 and the header #1-0 are transmitted directly, 14 syntax elements are transmitted in total (2 (headers)*7 (syntax elements)=14 syntax elements). However, if transmission of all or some of identical syntax elements can be skipped, a bandwidth or the number of bits required for header transmission can be saved, which results in an increase in a low-latency effect of stream transmission. As such, a process of segmenting a bit stream into a header and data is necessary before removing duplication or additionally producing duplication.

As an example, if some of headers of bit streams belonging to different regions are identical, the DS generator 1134 may modify any one identical header to a compact header. That is, the parsing unit #0 1135-0 according to the present embodiment may generate a compact header except for syntax elements identical to the header #1-0 from the header #0-0. In Table 1 and Table 2, since the remaining syntax elements are identical except for picture_width, the header #0-0 may be modified to a compressed form, i.e., picture_width, as shown in Table 3.

TABLE 3

| Syntax element | Value |
| --- | --- |
| header_type | 0xff12 |
| picture_width | 0x870 |

Referring to Table 3, the compact header is compressed to include only header_type and picture_width.

As another example, if some of headers of bit streams belonging to different regions are identical, the DS generator 1134 may segment the identical part to generate two or more compact headers. That is, the parsing unit #0 1135-0 according to the present embodiment may segment a duplicated part between the header #0-0 and the header #1-0 to generate two compact headers. For example, in Table 1 and Table 2, since header_type, size_of_header, picture_height, profile, slice_height, and precision are identical, the parsing unit #0 1135-0 and the parsing unit #1 1135-1 segment the identical syntax elements to generate a first compact header (Table 4) and a second compact header (Table 5), respectively.

TABLE 4

| Syntax element | Value |
| --- | --- |
| header_type | 0xff12 |
| size_of_header | 0x100 |
| picture_width | 0x870 |
| picture_height | 0x870 |

TABLE 5

| Syntax element | Value |
| --- | --- |
| header_type | 0xff12 |
| picture_width | 0x770 |
| profile | 0 |
| slice_height | 0x10 |
| precision | 0x00 |

In this case, picture_width which is not the identical syntax element is not removed and is included in a corresponding compact header. That is, the parsing unit #0 1135-0 allows the first compact header to include picture_width of the header #0-0, and the parsing unit #1 allows the second compact header to include picture_width of the header #1-0. Meanwhile, compact headers generated by duplicated header segmentation may have different data sizes.

As another example, if headers of bit streams belonging to different regions are completely identical, the DS generator 1134 may remove at least one of the identical headers. In this case, the removed header is not transmitted through the communication unit 1140.

Returning to FIG. 8, when the header, the compact header, and the data are input to the data selection unit 1136, the data selection unit 1136 generates a data stream including at least one of the header, the compact header, and the data according to a predetermined algorithm. Hereinafter, an operation of the data selection unit 1136 will be described in greater detail.

Figure 9:
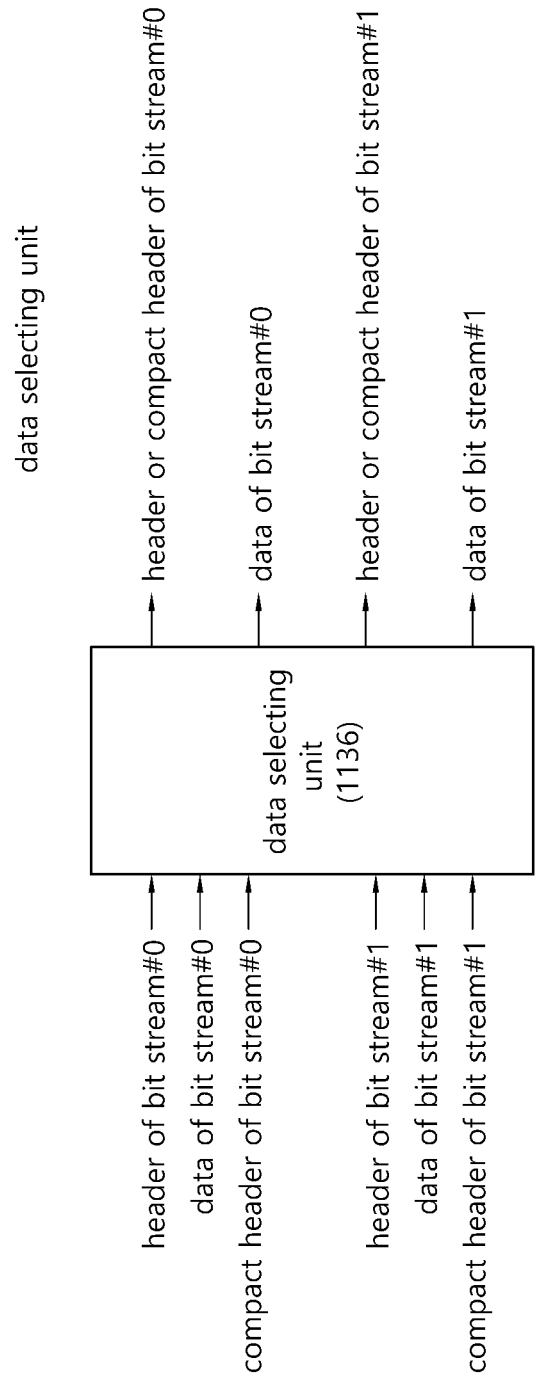
FIG. 9 illustrates an operation of a data selection unit according to an embodiment.

FIG. 9 illustrates an operation of a data selection unit according to an embodiment.

Referring to FIG. 9, for example, it is assumed that a header, data, and compact header of a bit stream #0 and a header, data, and compact header of a bit stream #1 are input to the data selection unit 1136. The data selection unit 1136 outputs a data stream in which any one of the header and compact header of the bit stream #0 is selectively combined with data, and outputs a data stream in which any one of the header or compact header of the bit stream #1 is selectively combined with data.

According to the present embodiment, a transmission mode of the header may be classified into four types according to which header is included in a data stream finally generated by the data selection unit 1136. The selection of the transmission mode may be performed adaptively or explicitly. Hereinafter, an operation method for transmission modes 0 to 4 is disclosed.

In the transmission mode 0, the data selection unit 1136 inserts headers into a data stream by bypassing all headers without having to modify to compact headers, irrespective of whether headers of bit streams belonging to different regions are identical.

Figure 10:
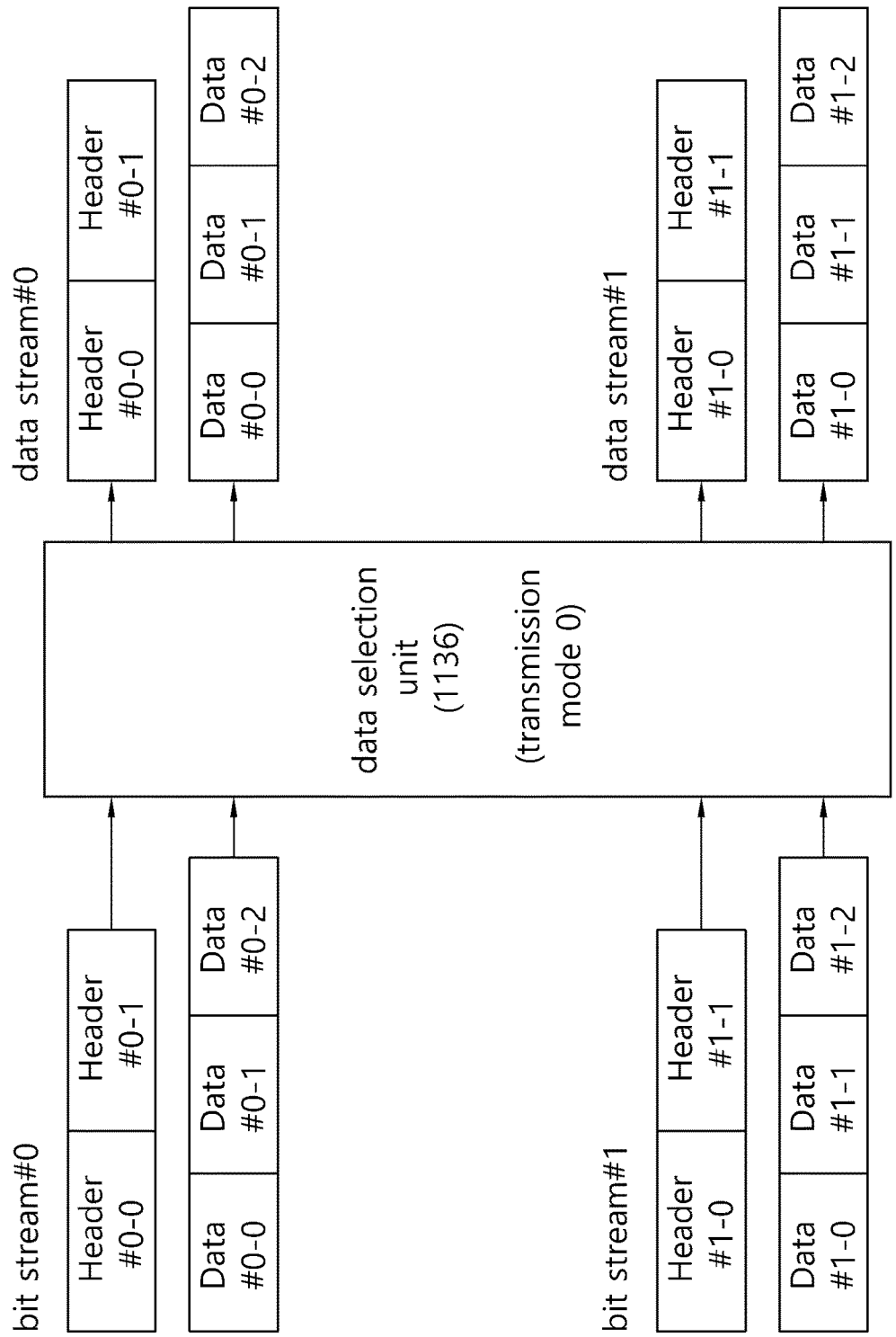
FIG. 10 illustrates a data stream generated in a transmission mode 0 according to an embodiment.

FIG. 10 illustrates a data stream generated in the transmission mode 0 according to an embodiment.

Referring to FIG. 10, in the transmission mode 0, the data selection unit 1136 directly outputs headers of bit streams #0 and #1 to be input. Accordingly, the data stream to be output is identical to a bit stream. In this case, the data stream to be output may be called the bit stream. In the transmission mode 0, since a compact header is not transmitted, a parsing unit may not generate a separate compact header. In this case, the compact header is not input to the data selection unit 1136.

In the transmission mode 1, the data selection unit 1136 modifies at least some headers into compact headers and inserts the modified headers to the data stream.

Figure 11:
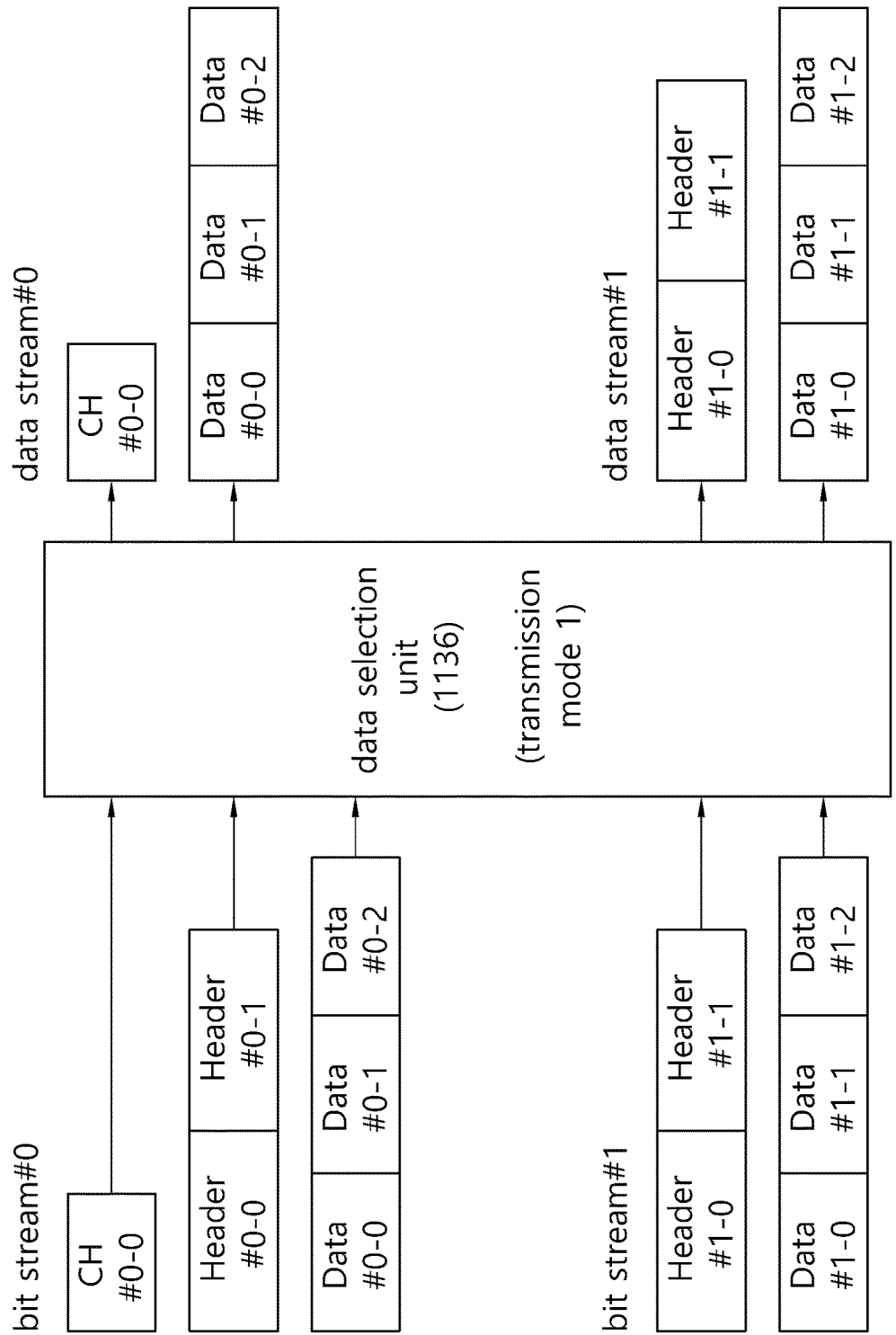
FIG. 11 illustrates a data stream generated in a transmission mode 1 according to another embodiment.

FIG. 11 illustrates a data stream generated in the transmission mode 1 according to another embodiment.

Referring to FIG. 11, in the transmission mode 1, between a header of bit streams #0 and #1 and a compact header (CH), the selection unit 1136 selects the CH and outputs a data stream in which the selected CH is combined with data. Herein, for example, as shown in Table 3, the CH #0-0 is obtained by removing the same syntax elements as the header #1-0 (Table 2) from the header #0-0 (Table 1). There is no compact header corresponding to the header #0-1 because the header #0-1 and the header #1-1 are completely identical and thus are removed. In this case, the removed header #0-1 or a compact header thereof is not inserted into the data stream #0.

In the transmission mode 2, the data selection unit 1136 inserts a compact header, which is generated by a parsing unit by segmenting duplicated headers, into a data stream. That is, in the transmission mode 2, the duplicated header is segmented and modified to a compact header, and is transmitted after being inserted into the data stream.

Figure 12:
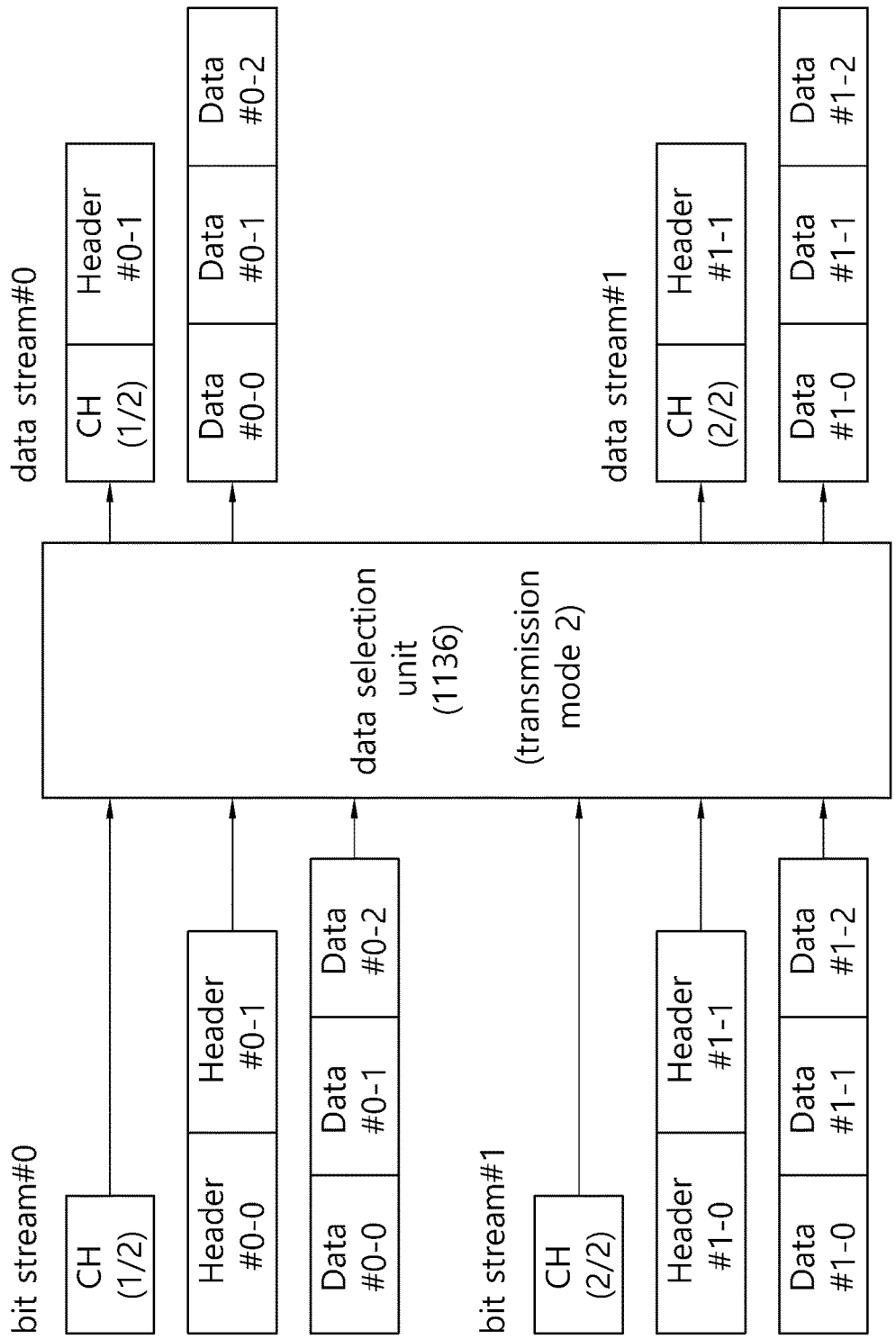
FIG. 12 illustrates a data stream generated in a transmission mode 2 according to another embodiment.

FIG. 12 illustrates a data stream generated in the transmission mode 2 according to another embodiment.

Referring to FIG. 12, for example, when a header #0-0 and a header #1-0 are as shown in Table 1 and Table 2, respectively, in the transmission mode 2, a first compact header, i.e., CH 1/2, and a second compact header, i.e., CH 2/2, are generated, which are obtained by segmenting duplicated parts. In this case, the data selection unit 1136 generates a data stream #0 obtained by combining data with the first compact header instead of the header #0-0, and generates a data stream #1 obtained by combining data with the second compact header instead of the header #1-0. Herein, since there is no similarity between the header #0-1 and the header #1-1, a separate compact header is not generated. Therefore, the headers are directly inserted into the data stream.

In the transmission mode 3, the data selection unit 1136 may generate a data stream by combining at least one or two of the transmission modes 0 to 2.

Figure 13:
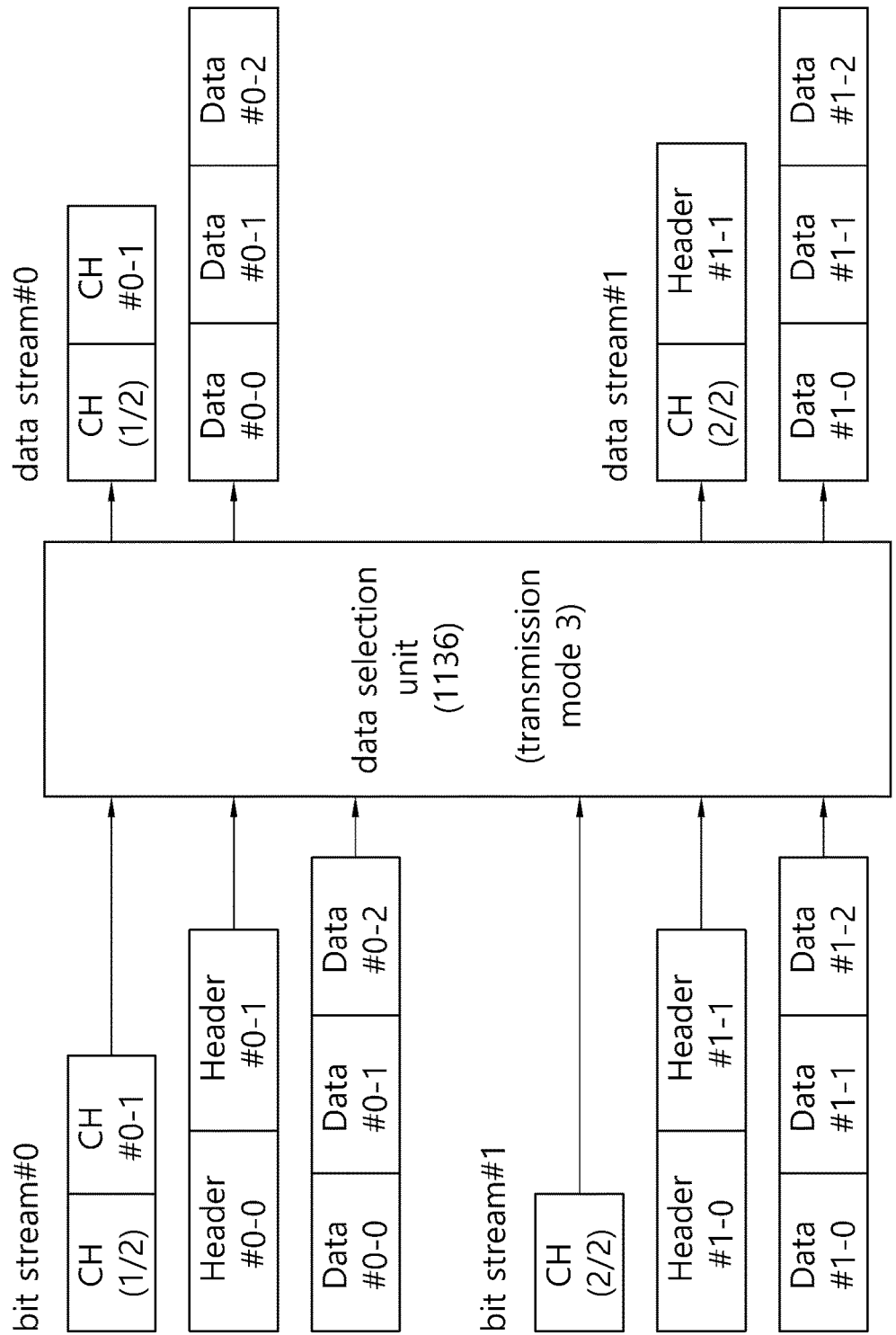
FIG. 13 illustrates a data stream generated in a transmission mode 3 according to another embodiment.

FIG. 13 illustrates a data stream generated in the transmission mode 3 according to another embodiment.

Referring to FIG. 13, the data selection unit 1136 in the transmission mode 3 selects a first compact header 1/2 and a second compact header 2/2 according to the transmission mode 2, and combines the headers with data to generate a data stream #0. In addition, the data selection unit 1136 in the transmission mode 3 selects a compact header #0-1 according to the transmission mode 1, and combines this with data to generate a data stream #1.

As such, a header which has great effect on image quality is transmitted adaptively according to a network condition and duplication of the same header is removed to reduce an amount of header transmission. Therefore, a network load and delay may be decreased in a system in which a low-latency picture is compressed and transmitted, and error robustness or error resilience may be improved.

Returning to FIG. 5b, the communication unit 1140 of the wireless stream transmitting device 1100 may include one or a plurality of data stream (DS) transmitters #0 1141-0 and #1 1141-1. In this case, respective data streams may be transmitted by being packed by the predetermined DS transmitters 1141-0 and 1141-1. For example, the DS transmitter #0 1141-0 may transmit a packet #0 by packing a data stream #0, and the DS transmitter #1 1141-1 may transmit a packet #1 by packing a data stream #1. There is no limitation in the number of DS transmitters. In addition, the DS transmitters 1141-0, 1141-1, . . . may exist as a function such as DS information generation and transmission performed by a physical layer or a MAC layer.

Meanwhile, a value of the header and/or compact header generated by the parsing unit is not limited in its range to a header (or part of the header) of a bit stream which is an output of the encoder 1132 and which is input to the parsing unit. That is, it is obvious that an operation of modifying and selectively transmitting the header of the bit stream according to the present embodiment is extendedly applicable to data as well as the header. For example, when a picture is encoded by being segmented into two parts, i.e., left and right sides, if the two pictures are identical, a bit stream for data of one side may not be transmitted. The parsing unit may compare bit streams generated by the sub-encoders #0 1132-0 and #1 1132-1 by a specific size. A size of data to be compared may use a pre-set value, or the size may be set by using an external device. For example, a header, data, and a compact header may be generated by comparing 1000 bytes from a specific position of a bit stream.

Now, a structure and operation of the wireless stream receiving device 1200 will be described in greater detail.

The processor 1230 of the wireless stream receiving device 1200 may further include the data stream (DS) processor 1232 and the decoder 1231.

When the communication unit 1210 of the wireless stream receiving device 1200 receives a packet for a picture to be segmented into a plurality of regions through a wireless channel from the communication unit 1140 of the wireless stream transmitting device 1100, the communication unit 1210 demodulates the packet to be output as a data stream which is a digital signal and inputs this to the DS processor 1232. Herein, the communication unit 1210 of the wireless stream receiving device 1200 may include a plurality of DS receivers #0 1211-0 and #1 1211-1. In this case, a packet corresponding to each data stream may be transmitted through the predetermined DS receivers 1211-0 and 1211-1. For example, the DS receiver #0 1211-0 may receive a packet 0 corresponding to a region 0 of the picture, and the DS receiver #1 1211-1 may receive a packet 1 corresponding to a region 1 of the picture. There is no limited in the number of DS receivers. In addition, each of the DS receivers #0 1211-0 and #1 1211-1 may exist as a function such as DS information reception and demodulation performed by a physical layer or a MAC layer.

The DS processor 1232 performs operations of parsing parallel data streams which are input from the communication unit 1210 through a network or input in an offline manner into a header (or a compact header) and data, if a header corresponding to a specific region is not received or the header corresponding to the region is a compact header, restoring the header corresponding to the specific region by using a header or compact header corresponding to at least another region, and outputting a bit stream including the restored header and the data.

Figure 14:
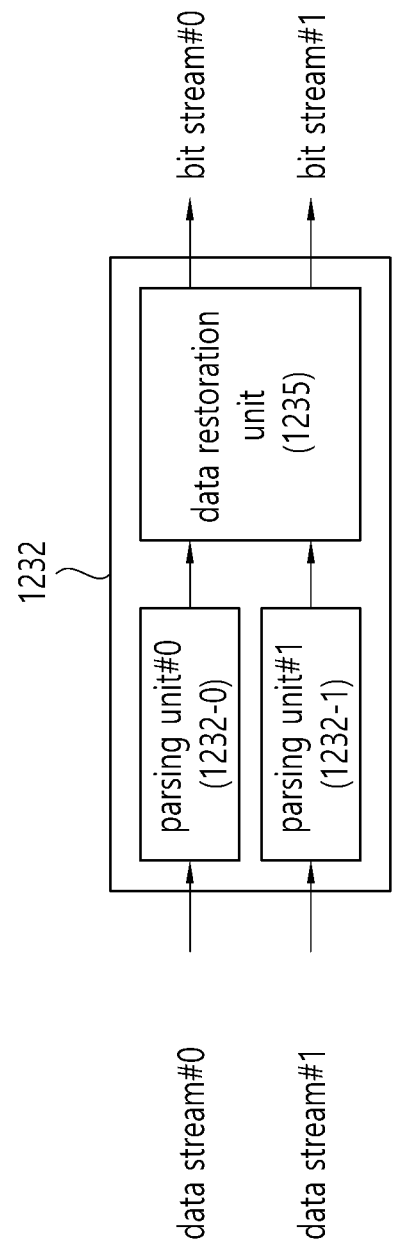
FIG. 14 is a block diagram illustrating a DS processor including a parsing unit and a data restoration unit according to an embodiment.

In order to perform such a function, the DS processor 1232 may include at least one of parsing units 1232-0 and 1232-1 and a data restoration unit 1235 as shown in FIG. 14.

FIG. 14 is a block diagram illustrating a DS processor including a parsing unit and a data restoration unit according to an embodiment.

Referring to FIG. 14, for example, from a perspective of the wireless stream transmitting device 1100, it is assumed that one picture is segmented into two regions #0 and #1, and bit streams #0 and #1 are generated for the respective regions and transmitted through the data streams #0 and #1.

The data stream #0 is input to a parsing unit #0 1232-0, and the data stream #1 is input to a parsing unit #1 1232-1. The parsing unit #0 1232-0 parses or segments the data stream #0 into a header part and a data part. The parsing unit #1 123201 also parses or segments the data stream #1 into a header part and a data part.

That is, the parsing unit performs an operation of identifying the header part and the data part from the data stream to be input. In the most standards including a picture or video, a transmission order between data in a bit stream is defined. In general, a header is transmitted, followed by transmission of data corresponding thereto. The header and the data are separated by a start code, and a start code value is a value which is not used for any other purpose in the bit stream. Accordingly, the parsing unit may search for the start code while sequentially receiving the data stream. If the parsing unit discovers the start code indicating data while receiving the header, it is determined that the header part is up to a corresponding position, and the data part is a position subsequent thereto (i.e., it is determined that reception of the header is complete). Accordingly, the parsing unit may identify the header part and the data part, based on the position of the start code indicating the data in the data stream.

Meanwhile, an output of the parsing unit is not always determined by a combination of the header part and the data part as in the present embodiment, and part of data may be omitted depending on the data stream. Therefore, the parsing unit may generate only the header part or may generate only the data part. The DS processor 1232 may use a separate buffer for storing the header part and data part generated by the parsing unit.

Upon receiving the parsed header part from the parsing unit, the data restoration unit 1235 restores an original header by comparing headers included in the header part. In order to prevent a delay caused by the header restoration, for example, the data restoration unit 1235 may start an operation of restoring the original header at a time of receiving the header part from the parsing unit.

As an example, if a header corresponding to a specific region is not received, the data restoration unit 1235 may copy a header corresponding to at least another region to restore the header corresponding to the specific region. In case of the transmission mode 1, at least one header is not transmitted if headers belonging to different bit streams are completely identical.

For example, as shown in FIG. 11, there is no compact header corresponding to the header #0-1 because the header #0-1 and the header #1-1 are completely identical and thus are removed. In this case, the header #0-1 or a compact header thereof is not inserted into the data stream #0. That is, the header #1-1 is transmitted, but the header #0-1 is not transmitted. In this case, the communication unit 1210 receives the header #1-1 and does not receive the header #0-1.

Figure 15:
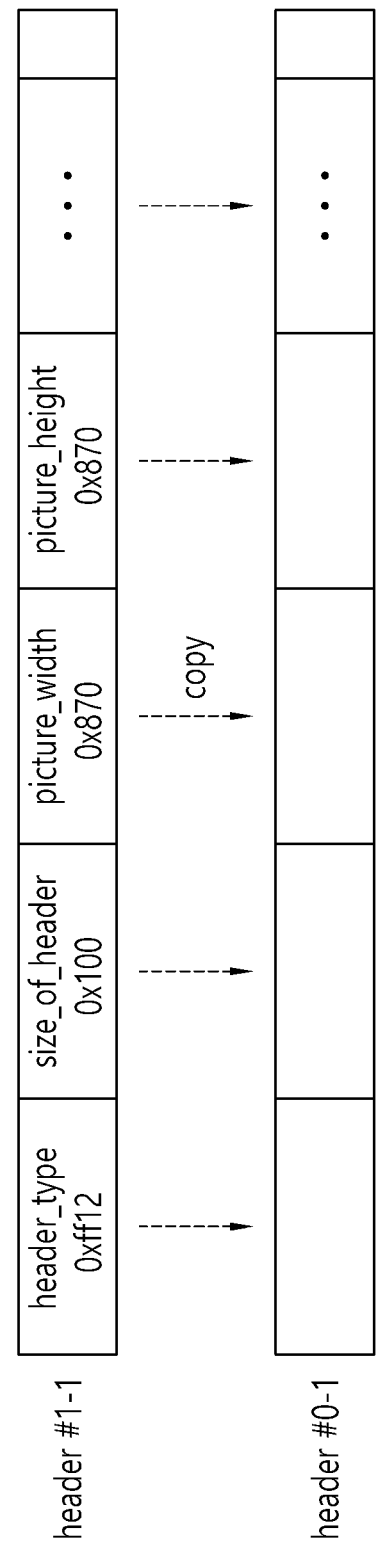
FIG. 15 illustrates a header restoration operation of a data restoration unit according to an embodiment.

Accordingly, as shown in FIG. 15, the data restoration unit 1235 may copy the received header #1-1 to generate the header #0-1 which is not received, thereby restoring the header #0-1.

As another example, upon receiving a compact header (i.e., in which some syntax elements are removed from a header) corresponding to a specific region, the data restoration unit 1235 may copy part (e.g., a syntax element) of a header corresponding to at least another region to restore the header corresponding to the specific region. In case of the transmission mode 1, if some of headers belonging to different bit streams are identical, since a compact header is transmitted for any one region, the data restoration unit 1235 may restore the compact header from an intact header corresponding to another region.

Figure 16:
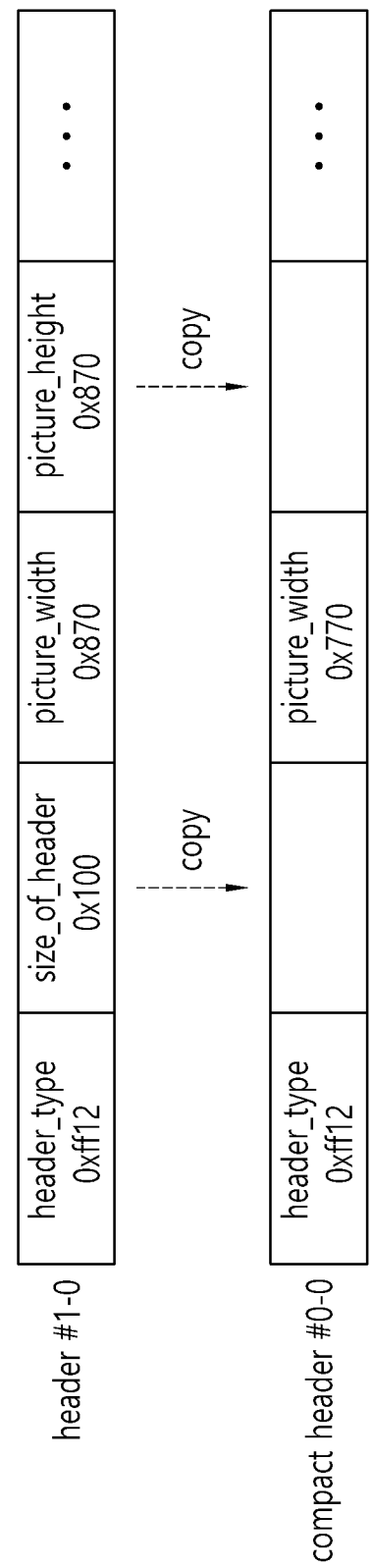
FIG. 16 illustrates an operation of a data restoration unit according to an embodiment.

For example, as shown in FIG. 11, a compact header (CH) #0-0 corresponding to a header #0-0, and a header #1-0 are transmitted. In this case, the communication unit 1210 receives the CH #0-0 and the header #1-0. Therefore, as shown in FIG. 16, the data restoration unit 1235 may copy some syntax elements of the received header #1-0 and add this to the CH #0-0, thereby restoring the header #0-0.

As another example, upon receiving compact headers for respective different regions (i.e., if some syntax elements are not transmitted in both headers), the data restoration unit 1235 may restore headers corresponding to respective regions by cross-copying compact headers thereof. In the transmission mode 2, if some of headers of bit streams belonging to different regions are identical, the identical part is segmented and transmitted as two or more compact headers. Therefore, the data restoration unit 1235 may restore headers corresponding to respective regions by cross-copying compact headers.

Figure 17:
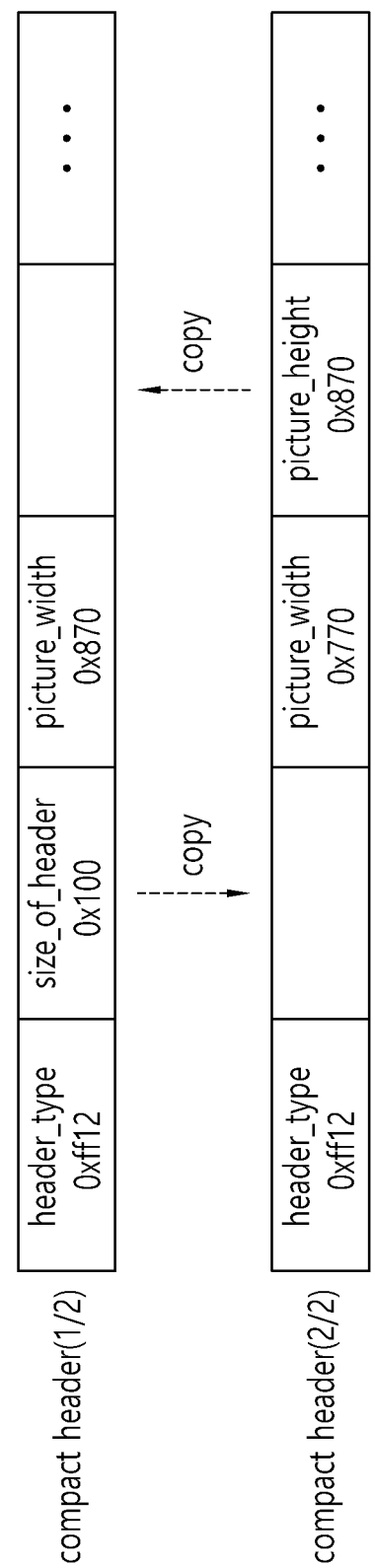
FIG. 17 illustrates an operation of a data restoration unit according to another embodiment.

For example, as shown in FIG. 13, a compact header 1/2 corresponding to the header #0-0 and a compact header 2/2 corresponding to the header #1-0 are transmitted. In this case, the communication unit 1210 receives the compact header 1/2 and the compact header 2/2. Therefore, as shown in FIG. 17, the data restoration unit 1235 may restore each of the header #0-0 and the header #1-0 by performing cross-copying in which some syntax elements of the received compact header 1/2 are copied to the compact header 2/2 and the other syntax elements of the compact header 2/2 are copied to the compact header 1/2.

In the present embodiment, the transmission mode may be implicitly indicated. In this case, a decoder may infer the transmission mode. In addition, in the present embodiment, the transmission mode may be explicitly indicated. That is, a bit stream mode of an encoder and decoder may be explicitly indicated. For example, the transmission modes 0 to 3 may be set within a bit stream or by using an external device, or may be predefined at a system level.

Returning to FIG. 14, the DS processor 1232 may perform not only an operation of restoring an original header but also an error recovery operation of a header. An error of the header may include a header transmission error which occurs in the process of transmitting the header through a wireless channel and a header decoding error which occurs in decoding of the header. The present embodiment is described based on the header transmission error.

In general, when the header transmission error occurs, the wireless stream receiving device 1200 requests the wireless stream transmitting device 1100 to retransmit a corresponding header (i.e., a packet including the header). However, not only this causes a delay but also repeated data retransmission makes a network condition worse.

As described above, mutual similarity (similarity of the number of headers and/or header syntax elements) exists between headers transmitted in parallel, based on one picture. Therefore, when headers having mutual similarity at the time of transmission are partially lost in the process of being transmitted through a wireless channel, mutual similarity may disappear. In this case, the DS processor 1232 performs error recovery such that a header distinct from the other headers is corrected in the same manner as the other headers.

As an example, the DS processor 1232 may perform operations of comparing headers corresponding to a plurality of regions with one another, determining a syntax element having a different value among syntax elements of the same type as a transmission error, and correcting the syntax element determined as the transmission error to a normal syntax element.

FIG. 18 illustrates an error recovery operation of a DS processor according to an embodiment.

Referring to FIG. 18, it is assumed that one picture is segmented into four regions #0, #1, #2, and #3, and the wireless stream receiving apparatus 1200 receives headers #0, #1, #2, and #3 for the respective regions. Each header includes a syntax such as a header type, a header size, a picture width, a picture height, or the like. However, it can be seen that a syntax element marked in bold has an error in a specific header even after network retransmission is performed by a determined count.

For example, regarding a header type of headers #0 to #3, a header type value of the headers #0, #2, and #3 is 0xff12, whereas a header type value of header #1 is 0xff11. Accordingly, the DS processor 1232 may regard a header type value of headers #0, #2, and #3, which are majority, as true and a header type value of the header #1, which is minority, as false, and thus may correct the header type value of the header #1 to a value indicating true.

In this way, error recovery is possible without having to separately retransmit headers with a transmission error. Therefore, a delay time caused by retransmission can be avoided. Herein, the DS processor 1232 may request the wireless stream transmitting device 1100 to stop transmission of another duplicated header being transmitted when one header arrives.

The DS processor 1232 outputs parallel bit streams including restored headers and data, and inputs the bit streams to the decoder 1231.

Returning to FIG. 5b, the decoder 1231 includes a plurality of sub-decoders #0 1233-0 and #1 1233-1 and an image combination unit 1234. The plurality of sub decoders #0 1233-0 and #1 1233-1 output respective segmented pictures by decoding parallel bit streams input from the DS processor 1232.

The image combination unit 1234 performs an operation of concatenating the segmented pictures decoded by an engine of respective sub-encoders into one complete picture. Herein, the engine refers to a unit of decoding in which decoding and reproducing can be achieved in a unit of bit streams. The image combination unit 1234 may restore a complete picture, based on a header of each engine.

Figure 19A:
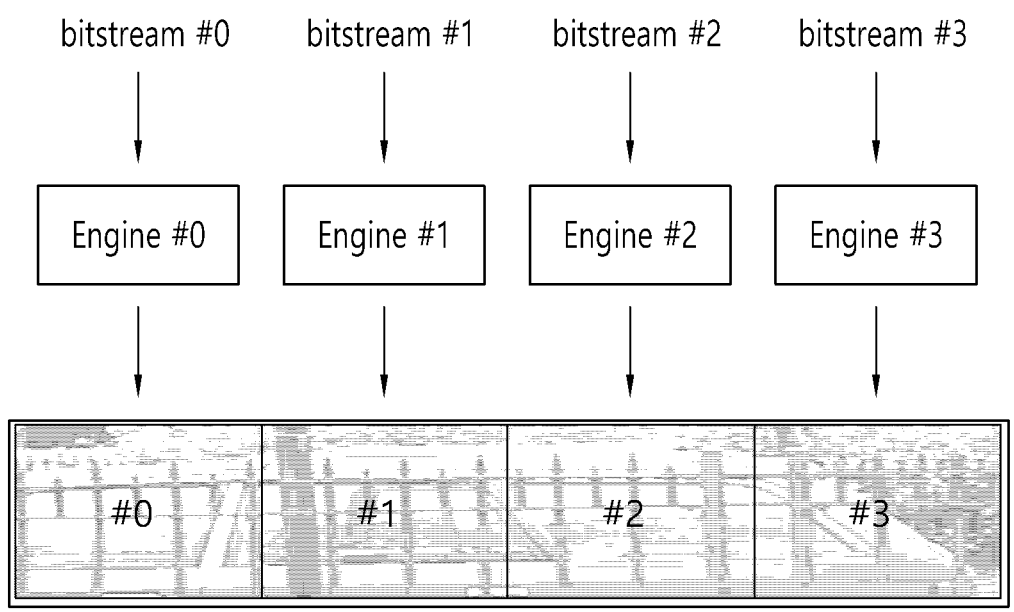
FIG. 19a and FIG. 19B are examples of an operation of combining one picture including a plurality of regions by decoding a bit stream for each region.
Figure 19B:
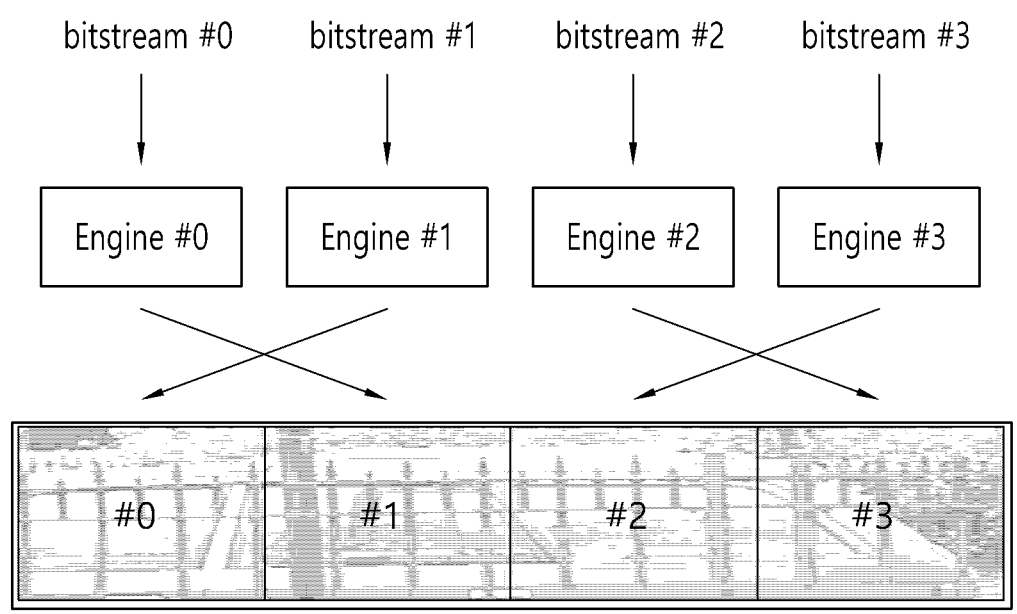

For example, as shown in FIG. 19a and FIG. 19b, when the number of parallel bit streams is 4 (#0, #1, #2, #3) and a width of a picture parsed by each engine from a header is 100, the image combination unit 1234 may concatenate four segmented pictures #0, #1, #2, and #3 having a width of 100 to configure a picture having a picture width of 400. FIG. 19a is an example in which one sub-encoder (or engine) is fixed to a specific region and performs encoding on the specific region, and FIG. 19b is an example in which one sub-encoder (or engine) is not fixed to a specific region and performs encoding on any region. Obviously, a segmented region to be processed by the engine may be predefined at a system level, and the segmented region allocated to the engine may be explicitly indicated or stored within a bit stream or by an external device.

Figure 20:
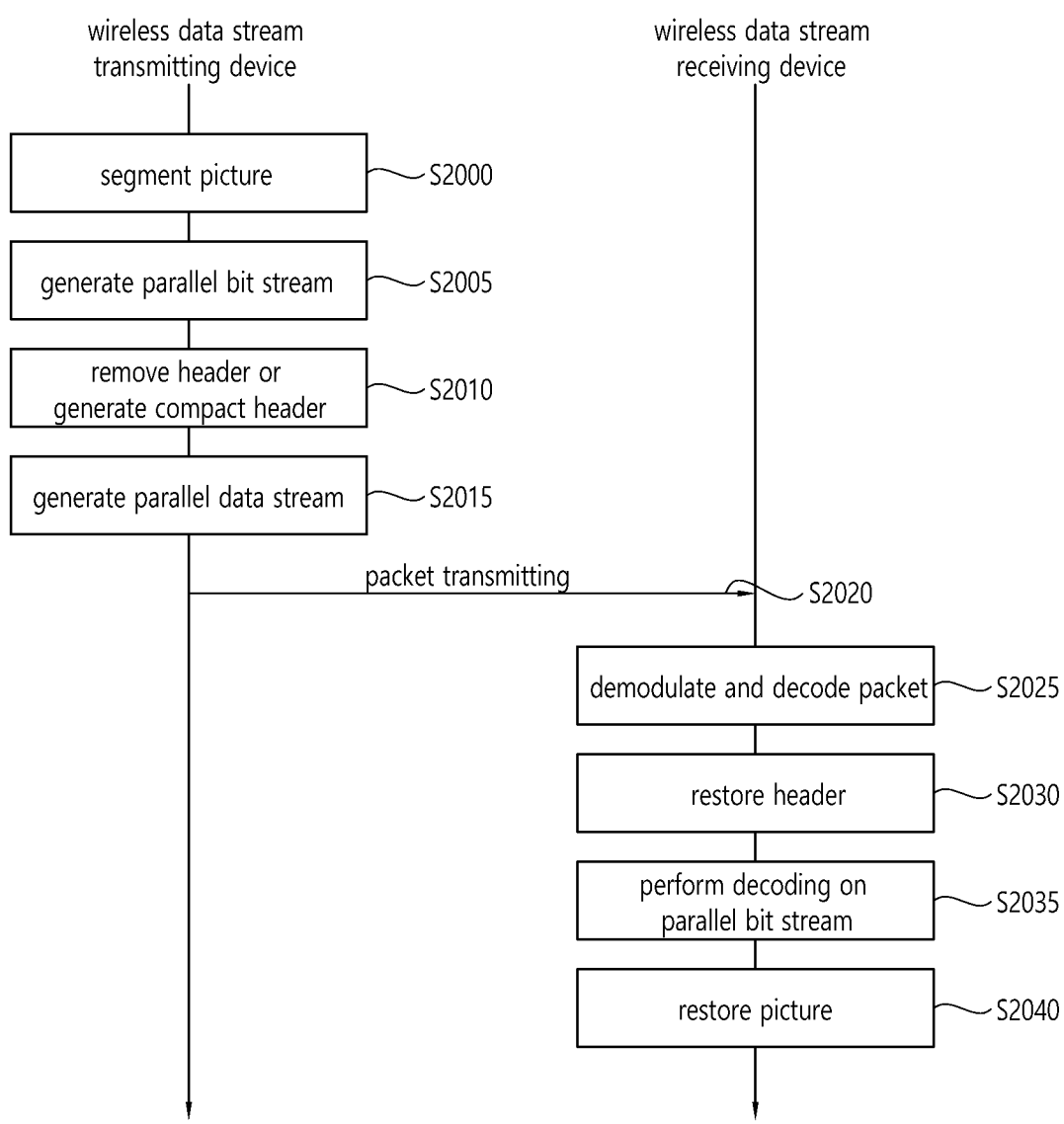
FIG. 20 is an operational flowchart of a wireless stream transmitting device and receiving device according to an embodiment.

FIG. 20 is an operational flowchart of a wireless stream transmitting device and receiving device according to an embodiment.

Referring to FIG. 20, the wireless stream transmitting device segments a picture to be input into a plurality of regions (S2000). For example, the wireless stream transmitting device may segment one picture into a plurality of regions as shown in FIG. 6A or FIG. 6B.

The wireless stream transmitting device performs encoding on each region to generate a parallel bit stream including a header and data (S2005).

The wireless stream transmitting device may parse the bit stream into the data and the header, and then removes at least some of headers for the plurality of regions or modifies the some headers to compact headers (2010).

Herein, the wireless stream transmitting device may remove the at least some headers or modify the some headers to the compact headers, based on similarity between the headers for the plurality of regions.

As an example, if some of headers of bit streams belonging to different regions are identical, the wireless stream transmitting device may modify any one identical header to a compact header. For example, the wireless stream transmitting device may generate a compact header except for syntax elements identical to syntax elements of the header #1-0 based on Table 2 from syntax elements of the header #0-0 based on Table 1.

As another example, if some of headers of bit streams belonging to different regions are identical, the wireless stream transmitting device may segment the identical part to generate two or more compact headers.

As another example, if headers of bit streams belonging to different regions are completely identical, the wireless stream transmitting device may remove at least one of the identical headers. In this case, the removed header is not transmitted.

The wireless stream transmitting device generates a parallel data stream in which any one of a header and compact header of each bit stream is selectively combined with data (S2015).

According to the present embodiment, a transmission mode of the header may be classified into four types according to which header is included in a data stream finally generated by the wireless stream transmitting device. The transmission mode of the present embodiment corresponds to the transmission modes 0 to 3 described according to various embodiments of the present specification.

As an example, in the transmission mode 0, the wireless stream transmitting device inserts headers into a data stream by bypassing all headers without having to modify to compact headers, irrespective of whether headers of bit streams belonging to different regions are identical.

As another example, in the transmission mode 1, the wireless stream transmitting device modifies at least some headers to the compact headers and inserts the modified headers to the data stream.

As another example, in the transmission mode 2, the wireless stream transmitting device inserts a compact header, which is generated by a parsing unit by segmenting duplicated headers, into a data stream. That is, in the transmission mode 2, the duplicated header is segmented and modified to a compact header, and is transmitted after being inserted into the data stream.

As another example, in the transmission mode 3, the data selection unit 1136 may generate a data stream by combining at least one or two of the transmission modes 0 and 2.

The wireless stream transmitting device transmits a packet by packing each of the data streams (S2020).

The wireless stream receiving device receives a packet including a parallel data stream from the wireless stream transmitting device (S2020).

The wireless stream receiving device demodulates the packet to be output as a parallel data stream which is a digital signal (S2025).

The wireless stream receiving device parses parallel data streams into a header (or a compact header) and data, and if a header corresponding to a specific region is not received or the header corresponding to the region is a compact header, restores the header corresponding to the specific region by using a header or compact header corresponding to at least another region (S2030).

The operation of step S2030 will be described detail. The wireless stream receiving device performs an operation of identifying the header part and the data part from the data stream to be input. In the most standards including a picture or video, a transmission order between data in a bit stream is defined. In general, a header is transmitted, followed by transmission of data corresponding thereto. The header and the data are separated by a start code, and a start code value is a value which is not used for any other purpose in the bit stream. Accordingly, the wireless stream receiving device may search for the start code while sequentially receiving the data stream. If the wireless stream receiving device discovers the start code indicating data while receiving the header, it is determined that the header part is up to a corresponding position, and the data part is a position subsequent thereto (i.e., it is determined that reception of the header is complete). Accordingly, the wireless stream receiving device may identify the header part and the data part, based on the position of the start code indicating the data in the data stream.

The wireless stream receiving device restores an original header by comparing headers included in the header part. In order to prevent a delay caused by the header restoration, for example, the wireless stream receiving device may start an operation of restoring the original header at a time of receiving the header part.

As an example, if a header corresponding to a specific region is not received, the wireless stream receiving device may copy a header corresponding to at least another region to restore the header corresponding to the specific region. In case of the transmission mode 1, at least one header is not transmitted if headers belonging to different bit streams are completely identical. Accordingly, as shown in FIG. 15, the wireless stream receiving device may copy the received header #1-1 to generate the header #0-1 which is not received, thereby restoring the header #0-1.

As another example, upon receiving a compact header (i.e., in which some syntax elements are removed from a header) corresponding to a specific region, the wireless stream receiving device may copy part (e.g., a syntax element) of a header corresponding to at least another region to restore the header corresponding to the specific region. In case of the transmission mode 1, if some of headers belonging to different bit streams are identical, since a compact header is transmitted for any one region, the wireless stream receiving device may restore the compact header from an intact header corresponding to another region.

As another example, upon receiving compact headers for respective different regions (i.e., if some syntax elements are not transmitted in both headers), the wireless stream receiving device may restore headers corresponding to respective regions by cross-copying compact headers thereof. In the transmission mode 2, if some of headers of bit streams belonging to different regions are identical, the identical part is segmented and transmitted as two or more compact headers. Therefore, the wireless stream receiving device may restore headers corresponding to respective regions by cross-copying compact headers.

In the present embodiment, the transmission mode may be implicitly indicated. In this case, a decoder may infer the transmission mode. In addition, in the present embodiment, the transmission mode may be explicitly indicated. That is, a bit stream mode of an encoder and decoder may be explicitly indicated. For example, the transmission modes 0 to 3 may be set within a bit stream or by using an external device, or may be predefined at a system level.

The step S2030 may further include an error recovery operation. For example, the step S2030 may include operations in which the wireless stream receiving device compares headers corresponding to a plurality of regions with one another, determines a syntax element having a different value among syntax elements of the same type as a transmission error, and corrects the syntax element determined as the transmission error to a normal syntax element.

The wireless stream receiving device generates parallel bit streams including restored headers and data, and performs decoding thereon (S2035).

The wireless stream receiving device performs an operation of concatenating the segmented pictures decoded by an engine of respective sub-encoders into one complete picture. Herein, the engine refers to a unit of decoding in which decoding and reproducing can be achieved in a unit of bit streams. The wireless stream receiving device may restore a complete picture, based on a header of each engine.

Since not all components or steps are essential in the aforementioned wireless stream receiving device and method or transmitting device and method, the wireless stream receiving device and method or transmitting device and method may be performed by including some or all of the aforementioned components or steps. In addition, embodiments of the aforementioned wireless stream receiving device and method or transmitting device and method may be performed in combination with each other. In addition, each of the aforementioned components or steps does not necessarily have to be performed in the order described above, and it is also possible that steps described later are performed prior to steps described earlier.

While the present disclosure has been particularly shown and described with reference to exemplary embodiments thereof, it will be understood by those skilled in the art that various changes in form and details may be made therein without departing from the spirit and scope of the disclosure as defined by the appended claims. Therefore, embodiments of the present disclosure described above can be implemented separately or in combination with each other.

The exemplary embodiments should be considered in descriptive sense only and not for purposes of limitation, and do not intend to limit technical scopes of the present disclosure. Therefore, the scope of the disclosure is defined not by the detailed description of the disclosure but by the appended claims, and all differences within the scope will be construed as being included in the present disclosure.

What is claimed is:

1. A wireless stream transmitting device comprising:
    an encoder which segments a picture to be input into a plurality of regions and performs encoding on each region to generate a bit stream comprising a header and data;
    a data stream (DS) generator which removes at least some of headers for the plurality of regions or modifies the some headers to compact headers, and generates a data stream for each region by combining headers remaining after being removed or the compact header with the data; and
    a communication unit which generates a packet by packing the data stream, and transmits the packet to a wireless stream receiving device, based on wireless communication,
    wherein the DS generator removes the at least some headers or modifies the some headers to the compact headers, based on a transmission mode,
    wherein the transmission mode comprises a first mode to a third mode,
    wherein the first mode is a mode in which all of the headers for the plurality of regions are directly transmitted,
    wherein the second mode is a mode in which, when the some headers among the headers for the plurality of regions are identical, only one header among the identical some headers is transmitted, and when syntax elements are identical between the some headers, at least one header among the some headers is modified to the compact header, and
    wherein the third mode is a mode in which, when the some headers among the headers for the plurality of regions are identical, any one header is modified to a first compact header and another header is modified to a second compact header.

2. The wireless stream transmitting device of claim 1, wherein the DS generator removes the at least some headers or modifies the some headers to the compact headers, based on similarity between the headers for the plurality of regions.

3. The wireless stream transmitting device of claim 2, wherein the plurality of regions comprise a first region and a second region, and
    wherein if a first header for the first region is identical to a second header for the second region, the DS generator removes any one of the first header and the second header.

4. The wireless stream transmitting device of claim 2, wherein the plurality of regions comprise a first region and a second region, and
    wherein if a first header for the first region equally comprises some of syntax elements of a second header for the second region, the DS generator modifies the second header to the compact header by removing the some syntax elements from the second header.

5. The wireless stream transmitting device of claim 1, wherein the header and the data are parsed from the bit stream and then are input to the DS generator.

6. The wireless stream transmitting device of claim 1, wherein the encoder comprises a plurality of sub-encoders configured in parallel so that encoding is performed individually on each of the regions.

7. A wireless stream receiving device comprising:
    a communication unit configured to receive a packet for a picture from a wireless stream transmitting device and demodulate the packet to output a data stream comprising a header and data for each of a plurality of regions constituting the picture, based on wireless communication;
    a data stream (DS) processor which, when a header corresponding to a region is not received or the header corresponding to the region is a compact header, restores the header corresponding to the region by using the compact header or a header corresponding to at least another region, and outputs a bit stream comprising the restored header and the data; and
    a decoder which decodes the bit stream to restore the picture,
    wherein the DS processor restores the header corresponding to the region, based on a transmission mode,
    wherein the transmission mode comprises a first mode to a third mode,
    wherein the first mode is a mode in which all of the headers for the plurality of regions are directly transmitted,
    wherein the second mode is a mode in which, when some headers among the headers for the plurality of regions are identical, only one header among the identical some headers is transmitted, and when syntax elements are identical between the some headers, at least one header among the some headers is modified to the compact header, and
    wherein the third mode is a mode in which, when the some headers among the headers for the plurality of regions are identical, any one header is modified to a first compact header and another header is modified to a second compact header.

8. The wireless stream receiving device of claim 7, wherein, when the header corresponding to the region is not received, the DS processor restores the header corresponding to the region by copying the header corresponding to the at least another region.

9. The wireless stream receiving device of claim 7, wherein the header corresponding to the region is the compact header, the DS processor restores the header corresponding to the region by inserting at least part of a syntax element included in the header corresponding to the at least another region to the compact header.

10. The wireless stream receiving device of claim 7, wherein the decoder comprises a plurality of sub-decoders configured in parallel so that decoding is performed individually on each of the regions.

* * * * *